United States Patent [19]

Ganoung

[11] Patent Number: 4,905,544
[45] Date of Patent: Mar. 6, 1990

[54] POWERTRAIN CONTROL APPARATUS FOR IMPROVING FUEL ECONOMY

[76] Inventor: David P. Ganoung, 2800½ Candelaria, NW, Albuquerque, N. Mex. 87107

[21] Appl. No.: 174,131

[22] Filed: Mar. 28, 1988

Related U.S. Application Data

[63] Continuation-in-part of Ser. No. 145,568, Jan. 19, 1988, which is a continuation-in-part of Ser. No. 859,431, May 5, 1986, Pat. No. 4,774,858, which is a continuation-in-part of Ser. No. 771,660, Sep. 3, 1985, abandoned, which is a continuation-in-part of Ser. No. 689,185, Jan. 7, 1985, which is a continuation-in-part of Ser. No. 451,613, Dec. 20, 1982, Pat. No. 4,505,169, which is a continuation-in-part of Ser. No. 205,625, Nov. 10, 1980, Pat. No. 4,383,456, which is a continuation-in-part of Ser. No. 20,916, Mar. 14, 1979, Pat. No. 4,280,469, which is a continuation-in-part of Ser. No. 767,060, Feb. 7, 1977, abandoned, which is a continuation-in-part of Ser. No. 616,640, Sep. 25, 1975, Pat. No. 4,023,641.

[51] Int. Cl.⁴ ............................................. B60K 41/18
[52] U.S. Cl. ........................................ 74/858; 74/866; 364/424.1
[58] Field of Search ............... 364/424.1; 74/866, 857, 74/858

[56] References Cited

U.S. PATENT DOCUMENTS

| | | | |
|---|---|---|---|
| 4,262,783 | 4/1981 | Scarrott et al. | 192/0.09 |
| 4,353,272 | 10/1982 | Schneider et al. | 74/859 |
| 4,505,169 | 3/1985 | Ganoung | 74/858 |
| 4,638,690 | 1/1987 | Hattori et al. | 74/866 |
| 4,648,290 | 3/1987 | Dunkley et al. | 74/866 |
| 4,714,144 | 12/1987 | Speranza | 192/0.084 |
| 4,732,055 | 3/1988 | Tateno et al. | 74/866 |
| 4,737,915 | 4/1988 | Hosaka | 364/431.07 |
| 4,774,858 | 10/1988 | Ganoung | 74/859 |
| 4,792,901 | 12/1988 | Mack et al. | 364/424.1 |

*Primary Examiner*—Dirk Wright

[57] ABSTRACT

Engine and transmission control apparatus for use in passenger cars and other applications includes a throttle-and-gear-ratio control system and a special calibration of the engine fuel metering system, both being oriented toward maximum fuel economy. Although the engine calibration was originated for use with the continuously variable type of transmission, the apparatus is instead intended for use with discrete-ratio transmissions. The throttle-and-gear-ratio control system makes only small sacrifices in fuel economy in order to significantly reduce the number of gearshifts executed by the transmission.

26 Claims, 6 Drawing Sheets

POWERTRAIN CONTROL APPARATUS FOR IMPROVING FUEL ECONOMY

CROSS REFERENCE TO RELATED APPLICATIONS

This application is a continuation-in-part of application Ser. No. 07/145,568, filed Jan. 19, 1988, now allowed, which is a continuation-in-part of application Ser. No. 06/859,431, filed May 5, 1986, now U.S. Pat. No. 4,774,858, which is a continuation-in-part of application Ser. No. 06/771,660, filed Sept. 3, 1985, now abandoned, which is a continuation-in-part of application Ser. No. 06/689,185, filed Jan. 7, 1985, now allowed, which is a continuation-in-part of application Ser. No. 06/451,613, filed Dec. 20, 1982, now U.S. Pat. No. 4,505,169, which is a continuation-in-part of application Ser. No. 06/205,625, filed Nov. 10, 1980, now U.S. Pat. No. 4,383,456, which is a continuation-in-part of application Ser. No. 06/020,916, filed Mar. 14, 1979, now U.S. Pat. No. 4,280,469, which is a continuation-in-part of application Ser. No. 05/767,060, filed Feb. 7, 1977, now abandoned, which is a continuation-in-part of application Ser. No. 05/616,640, filed Sept. 25, 1975, now U.S. Pat. No. 4,023,641.

BACKGROUND OF THE INVENTION

1. Field of the Invention

This invention relates to apparatus for controlling the operation of a combustion engine in response to an input command.

2. Description of the Prior Art

A predominant theme in the relevant prior art is that, when it is a primary objective to improve the fuel economy of passenger cars, a continuously variable transmission should replace a transmission of the more conventional discrete-ratio type. This theme completely neglects important practical considerations such as the technological risk of continuously variable transmissions and the fact that significant improvements can be made in conventional discrete-ratio transmissions without incurring technological risk. Also unrecognized is that drive-by-wire control further narrows the theoretical fuel economy gap between discrete-ratio and continuously variable transmissions.

In U.S. Pat. No. 4,353,272, Schneider et al disclose a drive-by-wire control system adaptable to both discrete-ratio and continuously variable transmissions. While such a control system would, entirely by itself, improve the fuel economy of a conventional passenger car with a gasoline engine and a discrete-ratio transmission, it would also increase engine exhaust emissions and cause an excessive number of gearshifts during city driving.

SUMMARY OF THE INVENTION

In view of the above, it is therefore an object of the present invention to provide apparatus for optimizing the operation of an Otto cycle engine as used in conjunction with a discrete-ratio transmission.

It is also an object of the invention to provide apparatus for selecting the active gear ratio in a discrete-ratio transmission such that the fuel economy of the associated engine is improved, but without ar the same time causing either excessive exhaust emissions or an inordinately high number of gearshifts.

It is another object of the invention to provide apparatus for increasing the fuel economy of an Otto cycle engine which powers an automotive vehicle.

It is still another object of the invention to provide apparatus for selecting the active transmission ratio and engine throttle position in an automotive vehicle to thereby increase fuel economy.

It is yet another object of the invention to provide an improved method for calibrating a shift map for a discrete-ratio transmission to be used in conjunction with an internal combustion engine. This calibration method places primary importance on fuel economy, but can also take engine exhaust emissions and torque converter losses into account.

These and other objects, features and advantages will become apparent to those skilled in the art from the following detailed description when read in conjunction with the appended claims and the accompanying drawing.

In accordance with the present invention in its broad aspect, apparatus for improving the fuel economy of an internal combustion engine is presented. For transmission control, the apparatus includes an electronic control module which continuously updates an approximate amount by which the current engine fuel consumption rate can be reduced if the gearshift to a more economical transmission gear ratio is executed. Although the reduction in fuel consumption rate is available with no change in engine power output or in vehicle speed, the control module does not always initiate the gearshift to the more economical gear ratio. Instead, a limited quantity of fuel may be sacrificed before abandoning the expectation that changes in factors such as vehicle speed and power output will return the current transmission ratio to the status of being the optimum of the available ratios. For engine control, the apparatus may include a drive-by-wire throttle control arrangement and a special calibration of the engine fuel metering system.

BRIEF DESCRIPTION OF THE DRAWING

The present invention is illustrated in the accompanying drawing, in which.

DESCRIPTION OF THE PREFERRED EMBODIMENT

Figure 1:
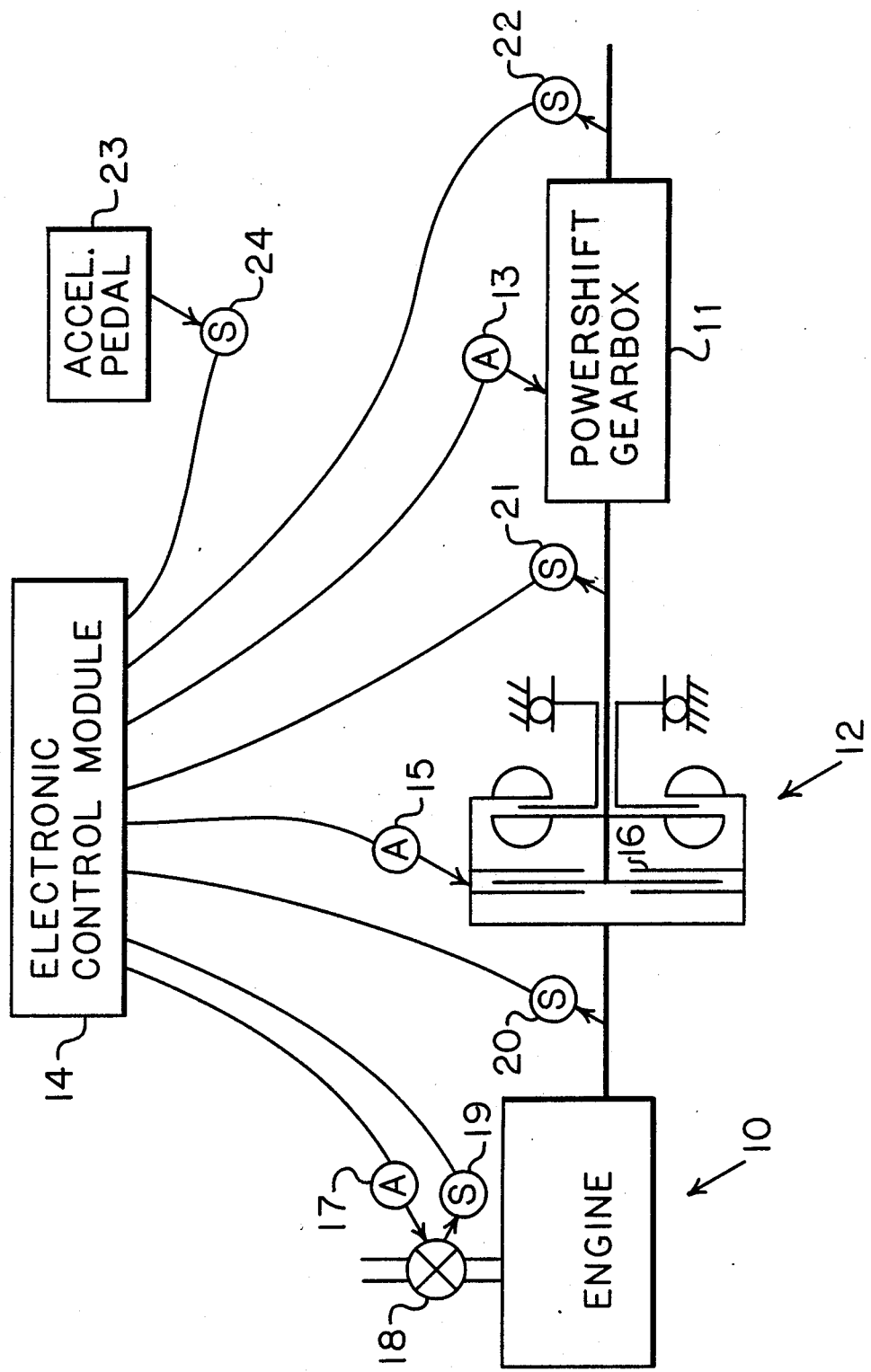
FIG. 1 shows the major components in an automotive powertrain which utilizes a preferred embodiment of the present invention.

FIG. 1 of the drawing shows the main components of a drive-by-wire control system assembled according to a preferred embodiment of the present invention. FIG. 1 also shows how these main components would interface with the major components in a conventional powertrain intended for use in a passenger car.

To begin with the powertrain components, a gasoline engine assembly 10 delivers its output power to a powershift gearbox 11 through a lock-up torque converter assembly 12. The shift actuator 13 enables one of the four discrete forward speed ratios contained within the planetary gearbox 11 as selected by the electronic control module (ECM) 14 of the drive-by-wire control system. Thus the torque converter assembly 12, powershift gearbox 11 and shift actuator 13 combine to form what is commonly known as a 4-speed automatic overdrive transmission. This transmission is of basically conventional automotive design and construction because the present invention focuses on transmission control, and on control of the engine 10.

The shift actuator 13 is shown symbolically in FIG. 1, as are all of the remaining actuators in the drive-by-wire control system, by the letter "A" (for actuator) enclosed in a small circle. To continue with these actuators, the lock-up actuator 15 engages and releases the lock-up clutch 16 in the torque converter assembly 12 as commanded by the ECM 14. Also as commanded by the ECM 14, the remaining actuator 17 opens and closes the engine throttle valve 18 to thereby secure a particular position of the throttle 18. In order for the throttle actuator 17 to establish the commanded position of the throttle 18, the throttle position sensor 19 provides the ECM 14 with an electrical signal indicating the actual position of the throttle 18.

As is the case for the remaining sensors in the drive-by-wire control system, the throttle position sensor 19 is shown symbolically in FIG. 1 by the letter "S" enclosed in a small circle. Next among these sensors, the engine speed sensor 20 provides an electrical signal to the ECM 14 indicating the actual crankshaft speed of the engine 10, and the converter speed sensor 21 provides the ECM with an electrical signal indicating the actual operating speed common to the output shaft of the torque converter assembly 12 and to the input shaft of the 4-speed gearbox 11. Yet another RPM speed signal, that for the output shaft of the gearbox 11, is sent to the ECM 14 by the gearbox output speed sensor 22. Last in FIG. 1 are the accelerator pedal 23 of the associated passenger car and its allied sensor 24 which sends to the ECM 14 an electrical signal indicating the current position of the pedal 23.

The remaining description of the preferred embodiment includes detail to the point of possibly obscuring basic operating principles and how these principles relate to hardware. Therefore, the following hypothetical example will make some deviations from the actual situation of the preferred embodiment to thereby focus on basic principles. The first deviation is to assume that an entirely conventional spark-ignition passenger car engine is used in conjunction with an advanced 5-speed automatic transmission. The lock-up clutch in the torque converter or fluid coupling of this advanced transmission engages before or during the upshift to 2nd gear, so that each of 2nd through 5th gears can closely approximate 100% efficiency in transferring power from the engine crankshaft to the transmission power output shaft. The other major assumption is that engine exhaust emissions will be acceptable even if transmission shift scheduling is carried out without regard to exhaust emissions.

This simplified example next assumes the gear ratios listed in the following table together with an initial cruising speed of about 45 miles per hour. Also assumed is that this cruising speed requires exactly 1500 RPM at the transmission output shaft, with the resulting engine speeds also being shown in the table for each gear ratio listed. The 1st gear engine speed of 5025 RPM would of course be marginal for an engine which develops maximum power at about 4800 RPM. Since slippage in an unlocked torque converter or fluid coupling would elevate actual engine speed above this listed value of 5025 RPM, 1st gear operation is considered to be impractical for the driving situation being assumed. At the other extreme, 5th gear allows only 1020 RPM at the engine crankshaft, and this in turn greatly restricts available engine power. A maximum of 25 HP is being assumed for the 1020 engine RPM of 5th gear.

A power magnitude of 15 HP is assumed to be required for level ground cruising at 45 MPH, and each of several different instances could require an increase from this magnitude, to say 35 HP. One such instance is continuing to maintain 45 MPH while climbing a particular hill. Another is initiating a particular level of acceleration at the original speed of 45 MPH. The following table applies to both of these instances, but the requirement for 35 HP means that the maximum of 25 HP in 5th gear is not sufficient. In other words, downshifting at least to 4th gear is mandatory.

|  | engine RPM at 45 MPH | Fuel Flow Rate (lb./hr.) for 35 HP at 45 MPH |
| --- | --- | --- |
| 1st (3.35 to 1) | 5025 | (too much engine RPM) |
| 2nd (1.93 to 1) | 2895 | 21 (BSFC = 0.60; 12.12 MPG) |
| 3rd (1.29 to 1) | 1935 | 16.625 (BSFC = 0.475; 15.31 MPG) |
| 4th (1 to 1) | 1500 | 17.5 (BSFC = 0.50; 14.54 MPG) |
| 5th (0.68 to 1) | 1020 | (not enough power) |

In contrast to the mandatory downshift to 4th gear, the next downshift, to 3rd gear, is only elective even though this following downshift would improve instantaneous fuel economy from 14.54 miles per gallon to 15.31 MPG, as listed in the table above. A slightly less efficient BSFC of 0.50 pounds per brake-horsepower-hour is assumed for the 1500 engine RPM in 4th gear than for the 1935 RPM in 3rd gear because 35 HP would approach the maximum torque available at 1500 RPM; in a completely conventional engine, enrichment of air-fuel ratio is used at the expense of efficiency to boost torque as the engine throttle approaches wide open. (If maximum torque increases by 5% in going from 1020 RPM to 1500 RPM, then the maximum power of 25 HP available at 1020 RPM will increase to 38.6 HP at 1500 RPM.)

The above table also lists the assumed BSFC values.

In the case of using 35 HP to accelerate from 45 MPH, the elective downshift to 3rd gear would not be desirable because the relatively small advantage in engine fuel flow rate would exist for only a short time before increasing vehicle speed would necessitate the offsetting upshift back to 4th gear. Which is to say that the product of a small reduction in fuel flow rate and a short period of time is not worth performing two extra gearshifts in the transmission. In the case of climbing a long hill, however, the much longer time interval over which the fuel flow advantage exists could justify the elective gearshift to 3rd gear, and then the shift back to 4th gear near the top of the long hill. So what sort of hardware will make these decisions concerning the tradeoff between fuel economy and reduced "shift busyness?"

To begin, the preceding table can be generated using: (1) transmission output shaft speed as indicated by a sensor like the sensor 22 in FIG. 1, (2) the desired power output as indicated by the position of the accelerator pedal and measured by a sensor like the sensor 24, (3) the complete selection of discrete gear ratios as available in a powershift gearbox like the gearbox 11, and (4) data giving the mass rate at which fuel flows for consumption to an engine exemplified by the engine 10.

Furthermore, if the available gear ratios are stored in digital memory along with a topographical surface of engine fuel flow rate over the area defined by engine power output and engine crankshaft speed, then an electronic control module (ECM) can continuously update the table several times each second to reflect changes in both accelerator pedal position and vehicle speed. (The sensor 22 for gearbox output shaft speed is in reality a vehicle speed sensor, or speedometer sensor, because of the fixed gear ratio coupling the output shaft of the gearbox 11 to the drive wheels of the associated vehicle; neither this fixed ratio drive arrangement nor the drive wheels are shown in the drawing.) This continuous updating of the candidate values of engine fuel flow rate is of course one of the functions that would be performed by an ECM similar to the ECM 14. Another function is to select an elective gearshift only when it appears likely that the total amount of fuel saved by the gearshift will more than offset its cost in other areas such as driveability and transmission life.

Driving a car in heavy traffic includes situations which illustrate the decision-making function of an ECM basically like the ECM 14. For instance, the driver might depress the accelerator pedal for fairly rapid acceleration, next release the pedal to cruise only briefly at a constant speed, and then resume acceleration. If the ECM were to select gearshifts purely on the basis of minimizing fuel flow rate, then one or more upshifts would accompany the very beginning of the brief interlude in acceleration, only to be closely followed by the offsetting downshift or downshifts at the end of the interlude. Since the total amount of fuel sacrificed by refraining from upshifting at the beginning of the interlude would be quite small, one especially good strategy is to mathematically integrate over real time the difference in fuel flow rate between that required for the existing gear ratio and that for the most economical gear ratio. The gearshift would not be performed until the integral, or accruing fuel deficit, reaches a threshold value which is likely to justify performing the gearshift. In the present example of a brief pause during acceleration, the resumption of acceleration at the end of the pause would occur prior to reaching the threshold. Moreover, the resumption of acceleration would return the existing gear ratio to the status of being the most economical of the available ratios, thereby causing the ECM to reset the fuel deficit to zero.

While a relatively slight delay in upshifting can thus have the benefit of causing unwanted upshifts to be aborted entirely, such delay is not desirable during a continuous acceleration of the associated passenger car from a stop. A variable threshold level for the accruing fuel deficit can solve this problem by having a minimal value which does not unacceptably delay upshifts during acceleration from a stop, and a much higher value attained after the execution of a few power-on downshifts indicates a more aggressive driving style. Stated a little differently, increases in the fuel deficit threshold which parallel increases in the frequency of power-on downshifts can serve to limit this frequency much in the same way that feedback control limits an error signal. As will be explained with reference to FIG. 4, other factors can also influence the threshold value.

Selection of transmission gear ratios as just outlined is only one major function of an ECM like the ECM 14. The other function is to regulate engine torque output by controlling the opening of the engine throttle valve exemplified by the throttle 18. This second function requires the ECM to store a second mapping of engine performance one that outputs the required throttle position as a function of current values for desired power output and engine crankshaft speed. Because engine power output depends on crankshaft speed as well as on throttle opening, the ECM will often adjust throttle position when accelerator pedal position remains unchanged. This somewhat peculiar action accommodates special engine and transmission shift calibrations which improve fuel economy, but which create difficulty when using a conventional throttle linkage.

Figure 2:
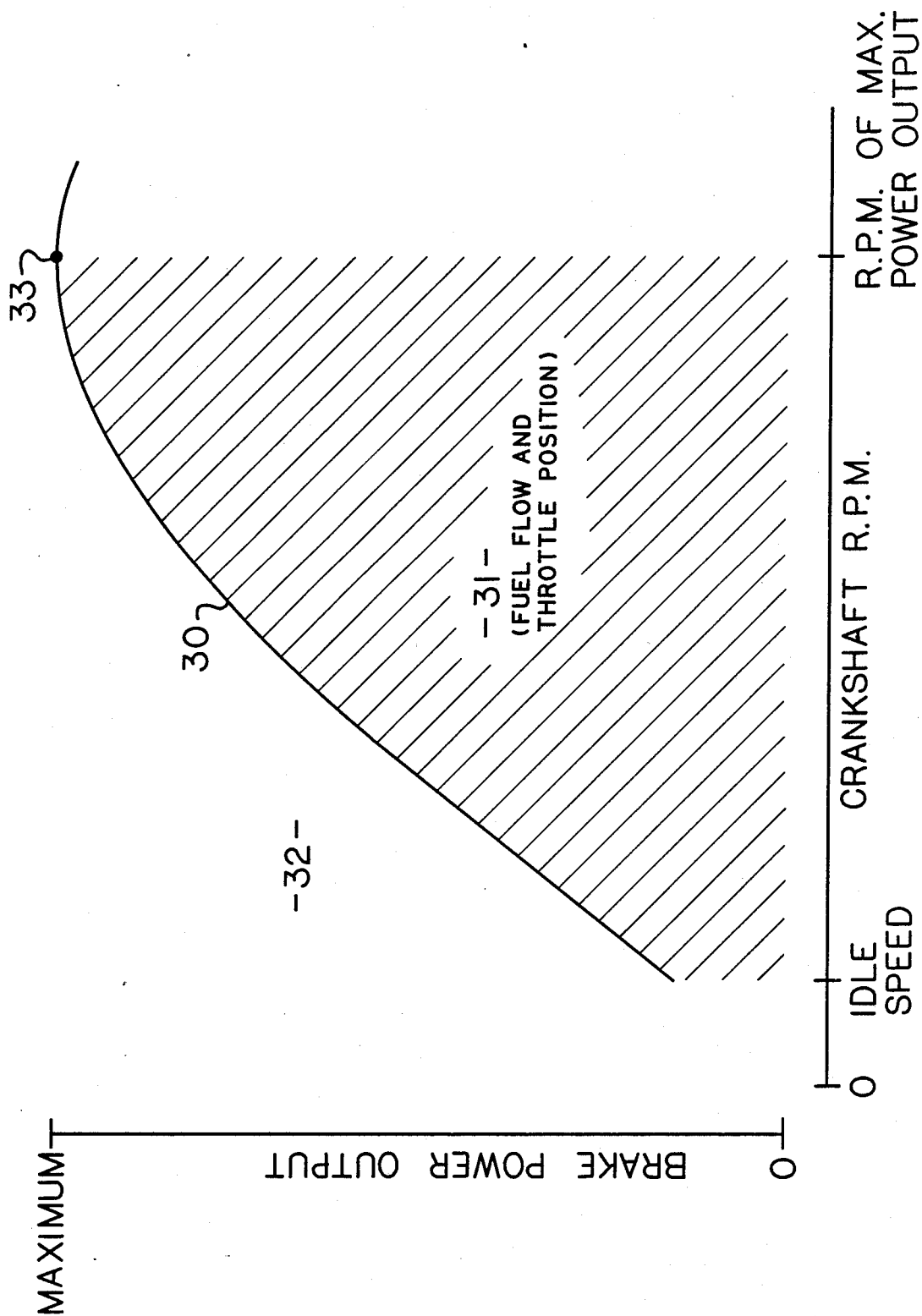
FIG. 2 represents dynamo meter data describing the performance of the engine of FIG. 1.

Looking ahead now in the accompanying drawing, FIG. 2 represents typographical surface mappings of engine performance data as permanently stored in read-only-memory (ROM) within the ECM 14 of FIG. 1. These engine performance data are obtained by stationary dynamometer testing the engine 10 or an identical engine at representative operating points throughout the complete ranges of crankshaft speed and output power. The data include mass rate of consumption of fuel by the engine 10, mass rate of emission of relevant chemical species of pollutants in the exhaust gas of the engine 10, and position of the throttle 18 of the engine 10. Scales for magnitudes of these data are not shown in FIG. 2 because these scales are perpendicular to the plane of FIG. 2. This plane is defined as shown by a scale for the magnitude of the brake power produced by the engine 10 versus a scale for operating speed of the engine 10 as measured by the RPM sensor 20. Topographical lines defining constant levels of the engine performance data are not shown in FIG. 2 because they have no special importance to the present invention.

Although three parameters of engine performance have just been enumerated for representation as topographical data surfaces above the plane defined by FIG. 2, two of these must be combined as follows before being stored as a single data surface in ROM of the ECM 14. Mass rate of fuel consumption by the engine 10 is first recognized to be the product of engine BSFC (brake specific fuel consumption, often in pounds per brake-horsepower-hour) and the brake power output concurrently developed by the engine 10. Exhaust emissions are also commonly expressed in units of mass per brake-horsepower-hour of mechanical energy provided by the crankshaft of the engine 10, and the mass emission rate of a particular pollutant is simply the product of the corresponding brake specific emission value and concurrent brake power output. Thus follows the realization that mass flow rates of fuel into the engine 10 and of any particular exhaust gas constituent out of the engine 10 are each equal to the more commonly used brake specific representation multiplied by power output. Furthermore, BSFC is the brake specific cost, in fuel alone, of operating the engine 10; this brake specific cost of engine operation can be expanded to also include the brake specific cost to the environment, in selected exhaust gas pollutants, of operating the engine 10. Consequently the expanded brake specific cost of operating the engine 10 consists of the sum of BSFC and weighted brake specific emission values for each of the appropriate exhaust gas pollutants. Additional weighting factors can, if necessary, be used to further extend the expanded brake specific cost of engine operation to other performance parameters of the engine 10. Finally, multiplication of the expanded brake specific cost of operating the engine 10 by the concurrent power output from the engine 10 yields what is herein defined to be "modified fuel flow rate" and is stored as a topographical data surface in the ECM 14. The data surface of positions of the engine throttle 18 above the plane of FIG. 2 is in contrast, stored in ROM of the ECM with only slight modification which will be considered later.

Choosing appropriate values for the emissions weighting factors to be used in calculating the modified fuel flow rate data to be stored in ROM of the ECM 14 depends heavily on the exhaust emission standards which must be met by the passenger car using the powertrain components of FIG. 1. Weight of the passenger car will also influence the compromise enforced by weighting factors between fuel economy and exhaust emission levels, but in any case, trial-and-error adjustment of the weighting factors during chassis dynamometer testing of the associated passenger car will often be necessary before the topographical data surface of modified fuel flow rate can be finalized for permanent storage in the ECM 14. Because of this trial-and-error process, all engine BSFC and emissions data from stationary dynamometer testing should be retained permanently for possible use later when, for instance, laws mandating exhaust emission levels might change or the powertrain components of FIG. 1 might be used in a different size car.

Three additional considerations effecting the magnitudes of the various weighting factors used to calculate the modified fuel flow rate to the engine 10 are as follows. First, higher levels of engine power output are in many cases seldom if ever used in the chassis dynamometer driving cycles used for exhaust emission certification. If so, the weighting factors can vary appropriately in magnitude to increasingly favor fuel economy over reduced exhaust emissions as power output from the engine 10 rises toward its upper level in FIG. 2. As the second consideration, substantial reduction in exhaust emissions may occasionally be available at a very modest cost in fuel economy. Only the use of weighting factors low in magnitude will identify such a situation. And third, the tradeoff between fuel economy and exhaust emissions, as implied by non-zero weighting factors, can usually be reduced or even eliminated if the gasoline engine 10 employs an advanced fuel metering system calibration as described in my copending United States patent application Ser. No. 145,568 (filed Jan. 19, 1988). The disclosure of this application Ser. No. 145,568 also explains theoretical aspects of engine calibration, and it is therefore incorporated herein in its entirety. Any modifications in engine calibration will in general change engine dynamometer maps of BSFC and brake specific emissions as well as the minimum weighting factor magnitudes required for acceptable exhaust emission levels.

Now considering the power boundary line 30 in FIG. 2, the maximum BMEP (brake mean effective pressure) power curve for the engine 10 provides the starting point from which the power boundary line 30 can be derived in the following way. At and near the normal idle speed of the engine 10, the need for acceptable levels of noise, vibration and harshness (commonly known as NVH in the automotive industry) reduces the height of the power boundary line 30 to well below the actual BMEP capability of the engine 10 at these speeds. The extent of this BMEP reduction shrinks rapidly as crankshaft speed of the engine 10 rises moderately above its idle level, and it depends on the design of powertrain components other than the engine 10, and even on the design of the associated passenger car. As a result, testing to locate the low RPM portion of the line 30 is best performed using the complete passenger car powered by the engine 10.

At the low-to-medium engine speeds where NVH ceases to be a consideratio. whether the line 30 is at all reduced below the maximum BMEP curve of the engine 10 depends mainly on the calibrations selected for the engine 10. For example, most conventional fuel metering calibrations for spark-ignition passenger car engines enrich the air-fuel mixture beyond stoichiometry well before BMEP reaches its upper limit. Even though the emissions weighting factors used to calculate the modified fuel flow rate data for the engine 10 do effectively limit emissions, they will cause a somewhat larger than necessary sacrifice in fuel economy unless the line 30 is located so as to exclude grossly excessive exhaust emissions from the cross-hatched area 31 in FIG. 2. On the other hand, the engine 10 could employ an advanced fuel metering calibration which attains high BMEP levels by progressively reducing intake charge dilution after the engine throttle 18 has already reached a position that is effectively wide open for the engine speed in question. (At low engine speeds, the throttle 18 will offer essentially no resistance to air flow before reaching its actual wide open position. Or, in other words, further opening of the throttle 18 beyond an effectively wide open position will have very little effect on the intake air flow rate unless the crankshaft speed of the engine 10 changes.) When using such an advanced calibration in conjunction with a high compression ratio for the engine 10, autoignition is more likely than emissions to determine the highest location of the line 30 acceptable for extended operation of the engine 10.

With the power boundary line 30 thus located at the highest practical level of power output, the topographical surfaces of engine data are divided into portions directly above the cross-hatched area 31 and directly above the other area 32. How the two topographical data surface portions (one of modified fuel flow rate and one of throttle position) directly above the cross-hatched area 31 are determined for storage in ROM of the ECM 14 has already been considered, but the other area 32 is largely outside the power producing capability of the engine 10. Nevertheless, the data surfaces must extend over this area 32 because the driver of the associated passenger car can at any time suddenly depress the accelerator pedal 23 hard to thereby command power levels in the uppermost portions of the plane defined by FIG. 2. For convenience, the modified fuel flow rate for the engine 10 as stored in the ECM 14 may remain at a constant value over the entire portion of the data surface located above the area 32; this constant value can nave any convenient magnitude.

In contrast, the topographical data surface for position of the engine throttle 18 does not remain flat directly above the area 32. The opening of the throttle 18 as stored in the ECM 14 does, however, remain fixed along any vertical line in FIG. 2 extending from the boundary line 30 to nearly the top of the scale for brake power output. The fixed throttle opening for each of these vertical lines is simply the value according to throttle opening along the line 30 as already explained, so that the values along line 30 are extended straight upward in FIG. 2. At the maximum power level in FIG. 2, the actually wide open position of the throttle 18 extends across the entire range of crankshaft speed of the engine 10. This mapping of wide open throttle to low engine speed does not cause an NVH problem because the gearbox 11 will immediately downshift to avoid low crankshaft speed when maximum power output is commanded. In addition, the lock-up clutch 16 will be released to avoid the problem at very low speeds of the associated passenger car.

As suggested earlier, performance of the engine 10 can be much enhanced by using an advanced fuel metering calibration which retreats from high levels of intake charge dilution only after the throttle 18 first reaches an effectively wide open position. In this case, an additional engine-torque-control parameter such as the position of an EGR valve may also have a separate topographical data surface stored in the ECM 14 as a function of engine power output and crankshaft speed. Such additional data surfaces are exactly like the one for position of the throttle 18 in the sense that, for example, EGR valve positions along the line 30 are extended straight upward in FIG. 2 to nearly the maximum level of engine power output. My U.S. patent application Ser. No. 145,568, incorporated herein, explains how to determine an EGR data surface directly over the other area 31 in FIG. 2, and EGR should be abruptly terminated at all engine speeds for the maximum power level in FIG. 2.

For the present invention, however, practical considerations such as transmission "shift busyness" have priority over achieving the very last increment in fuel economy. In keeping with this approach, the engine 10 employs a simplified calibration using the excess air of lean combustion rather than recirculated exhaust gas as the intake charge dilutant. (A richer exhaust-treatment catalyst will, as is the case for an automotive engine now in production, help meet mandated exhaust emission standards without EGR.) Also in the interest of simplified engine control is the fact that the throttle valve 18 is always used to make adjustments of the torque output of the engine 10. That is to say, the fuel-air ratio calibration of the engine 10 can have only one wide-open-throttle value at a given crankshaft speed of the engine 10.

This simplified calibration of the naturally-aspirated engine 10 requires little more than adjusting the engine fuel-air ratio to achieve the minimum BSFC possible while crankshaft speed and position of the throttle 18 are both held constant. This dynamometer procedure does require that ignition spark timing be varied to maintain best torque as the fuel-air ratio is varied in search of minimum BSFC. In addition, the fuel-air ratio actually chosen as part of the engine calibration might deviate slightly from minimum BSFC in order to secure a more than slight reduction in exhaust emissions. Similarly, relatively minor deviations from MBT (minimum for best torque) ignition spark timing might be desirable. This dynamometer calibration procedure must obviously be carried out for a sufficient number of representative engine operating points throughout the full ranges of crankshaft speed and throttle opening for the engine 10. In addition, the very last increment of movement of the accelerator pedal 23 to maximum commanded power output should activate abrupt enrichment of the fuel-air mixture for the engine 10.

As explained to this point, the FIG. 2 data developed for final permanent storage in the ECM 14 mainly describe performance available from the engine 10 as a function of crankshaft speed measured by the engine RPM sensor 20. These FIG. 2 data identically describe performance available, with the lock-up clutch 16 fully engaged, from the power unit made up of the engine 10 in combination with the torque converter assembly 12. With the lock-up clutch 16 engaged, the FIG. 2 data describe power unit 10 and 12 performance available at the output shaft of the torque converter assembly 12 as a function of converter output speed as identically measured by either the engine speed sensor 20 or the converter output RPM sensor 21. The power unit 10 and 12 obviously has another widely used operating mode, that with the lock-up clutch 16 fully released. In this other mode, the previous FIG. 2 data do not apply, and only the converter RPM sensor 21 will function effectively as an output RPM sensor for the power unit 10 and 12. The reason for these last two facts is that both power dissipation and torque multiplication occur in the torque converter 12 when its lock-up clutch 16 is released.

The entire power unit 10 and 12 can be tested in a stationary dynamometer in order to develop data which follow the same basic format as already explained with reference to FIG. 2, but which obviously do apply to the operating mode of the power unit 10 and 12 established with the lock-up clutch 16 released. As a generally more practical alternative, the previous data obtained from stationary dynamometer testing of the engine 10 by itself can be combined in a special way with data obtained from dynamometer testing of the unlocked torque converter 12 by itself. Since operation of the power unit 10 and 12 with the lock-up clutch 16 engaged is described by data from testing only the engine 10, it will be referred to herein as "engine-only data." Similarly, data describing operation of the power unit 10 and 12 with the clutch 16 released will be referred to herein as "engine-converter data" because it may be obtained from a combination of stationary dynamometer data for the engine 10 combined with stationary dynamometer data for the torque converter 12.

When the power unit 10 and 12 is operating with its lock-up clutch 16 released, the maximum power delivered by the torque converter 12 at its output shaft will normally require the engine 10 to be developing its maximum power output. This fact makes it convenient to begin dynamometer testing of only the torque converter 12 by fixing the input shaft speed of the converter 12 at the crankshaft RPM value necessary for the engine 10 to develop its maximum power output at point 33 on line 30 of the engine-only data. While maintaining this constant converter input speed, the load applied by the dynamometer to the output shaft of the converter 12 is increased until the concurrent input torque delivered to the input shaft of the converter 12 also matches the brake torque developed by the engine 10 at the power peak point 33 of the line 30 in FIG. 2. Consequently this initial procedure determines the power and RPM values at the power peak of a power boundary line like the line 30, but which now applies to operation of the power unit 10 and 12 with its lock-up clutch 16 released. Since power and RPM values at the input shaft of the converter 12 are always identical to the concurrent power and RPM values for the engine 10, values of throttle position and modified fuel flow rate are retrieved from engine-only data using input values of power and RPM for the converter 12. These values of throttle position and modified fuel flow rate are then assigned in the engine-converter data to the output values of power and RPM for the converter 12.

Next, the speed of the output shaft of the converter 12 is maintained at its peak power speed just described while the torque load applied to the output shaft of the converter 12 is progressively decreased to zero; converter input torque, and to a lesser extent, converter input speed must decrease as converter output torque decreases. Each of these representative operating points determines a point on the now modified plane of FIG. 2, and values of modified fuel flow rate and throttle opening to be located above these points on the new topographical surfaces for engine-converter data come from the FIG. 2 (engine-only) data, but at crankshaft values of speed and power identical to the values now being measured at the input shaft of the torque converter 12.

Just as the foregoing series of representative operating points for the power unit 10 and 12 takes place at a fixed RPM of the output shaft of the converter 12, another such series is repeated after incrementally decreasing the fixed output RPM of the converter 12 to a new fixed value. Which is to say that the first point in this new series has input values of speed and power taken from an appropriate point on line 30 of engine-only data. In this way, representative values for modified fuel flow rate and position of the throttle 18 are obtained over the full range for both speed and power at the power output shaft of the power unit 10 and 12, which is of course the output shaft of the converter 12. This engine-converter data is terminated at the output speed of the power unit 10 and 12 given by the peak power point on the engine-converter line corresponding to line 30 even though lighter output torque loads will further elevate output speed of the power unit 10 and 12 without increasing the crankshaft speed of the engine 10.

As shown in FIG. 2 by a short vertical segment at the beginning of line 30, the engine-only data does include at least a small range of power available at the idle speed of the engine 10. Similarly, the engine-converter data will have a range of power available at engine idle speed, but this power range will be much greater because of torque multiplication and slippage in the torque converter 12. Because of these same factors, the engine-converter data will have a significant power range even at less than engine idle speed, and the data can be extended all the way to zero RPM, but an alternative will be considered later. In addition, the torque converter 12 may benefit NVH to such an extent that the power boundary line 30 can be elevated to higher BMEP at low engine speed, but only for the purpose of generating the engine-converter data.

In summary of FIG. 2, it represents the finalized engine-only and engine-converter data stored in ROM of the ECM 14. In addition to this ROM, the ECM 14 contains digital circuitry for performing the gearshift mode selection procedure summarized by the flow charts of FIGS. 3 and 5. The ECM 14 repeats this gearshift mode selection procedure several times each second on a continuous basis using updated values for current position of the accelerator pedal 23 and for current speed of the output shaft of the gearbox 11.

Figure 3:
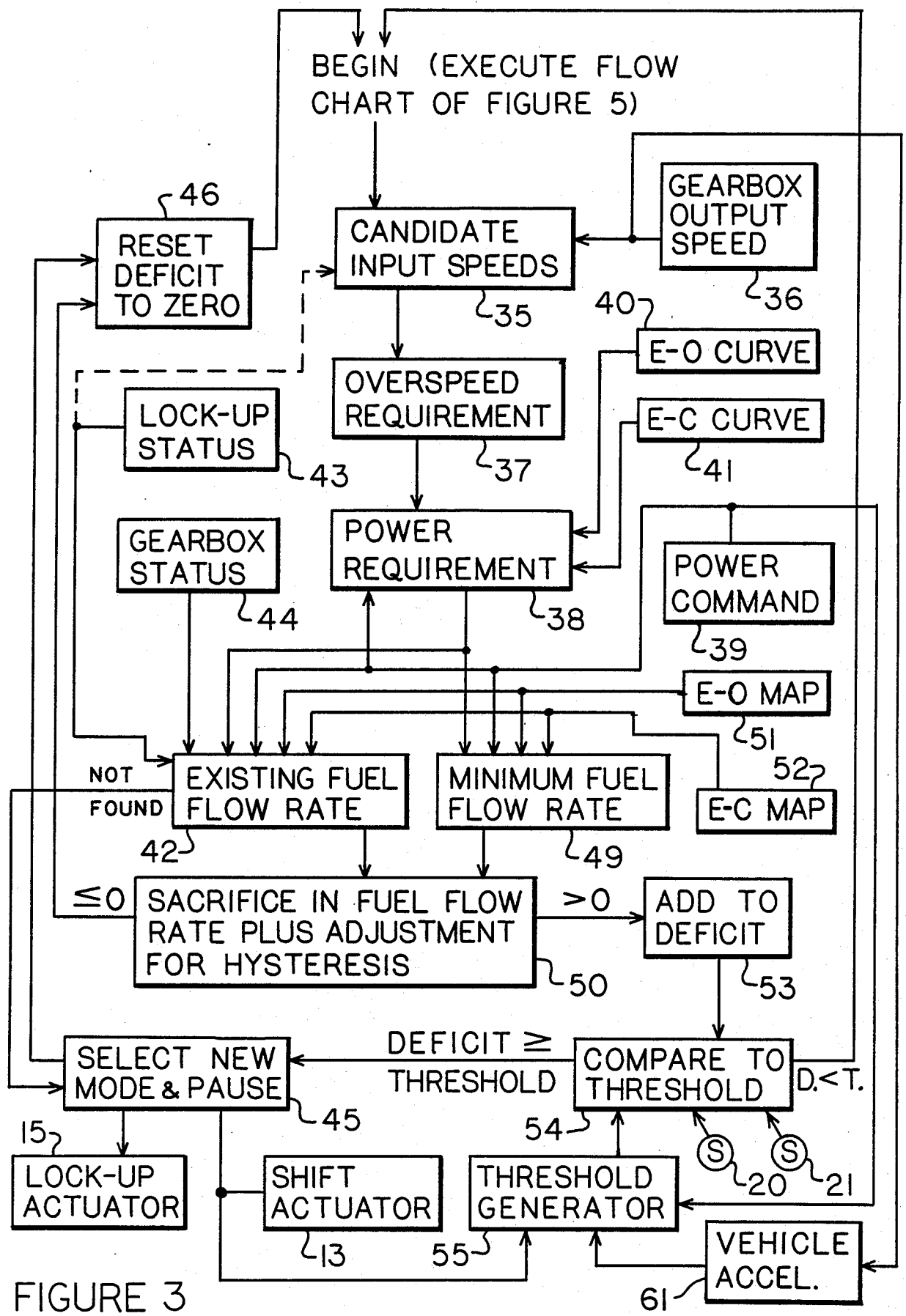
FIG. 3 presents a flow chart continuously repeated in controlling the torque converter and transmission of FIG. 1.

Reference numeral 35 identifies the first step executed by the ECM 14 in carrying out the portion of the gearshift mode selection procedure that is shown in FIG. 3 by itself. This first step 35 is to calculate all available input shaft speeds of the gearbox 11 based on the signal which is provided by the sensor 22 to indicate current output speed of the gearbox 11. Since this step 35 requires the current value 36 of output shaft speed of the gearbox 11 to be multiplied by each of the four forward speed ratios in the gearbox 11, these four speed ratios must be permanently stored in ROM of the ECM 14. The resulting candidate input speeds of the gearbox 11 also serve as candidate operating speeds for the power unit 10 and 12 because the power unit 10 and 12 is permanently coupled to drive the input shaft of the gearbox 11.

With all of the candidate operating speeds for the power unit 10 and 12 thus available via the step 35, the second step 37 in the gearshift selection procedure is to eliminate each candidate operating speed which exceeds the RPM value of the power peak 33 in FIG. 2. Since the corresponding power peak for engine-converter data has a lower RPM value due to slippage and torque multiplication in the unlocked torque converter 12, a candidate operating speed may be eliminated from consideration for engine-converter data, but not for engine-only data. In other words, a single candidate operating speed for the power unit 10 and 12 will encompass two candidate operating modes if the corresponding gear ratio in the gearbox 11 can be used with the lock-up clutch 16 either released or engaged; operation in this example gear ratio would at certain vehicle speeds overspeed the engine 10 with the lock-up clutch 16 released, but not with the clutch 16 engaged. Thus ROM in the ECM 14 must store separate upper RPM limits for engine-only and engine-converter data, as well as numerical codes indicating which candidate operating modes for the power unit 10 and 12 remain for further consideration after completion of steps 35 and 37. The range of these numerical identification codes may change with time. For example, fewer or even no gear ratios in the gearbox 11 may be acceptable for operation with the lock-up clutch 16 engaged during a period immediately following a cold start of the engine 10. As another example, the driver might manually select different tradeoffs between more extensive engagement of the lock-up clutch 16 to benefit fuel economy and less extensive engagement to benefit gearshift smoothness of the gearbox 11.

The foregoing examples of selectively reducing the range of candidate operating modes to thereby improve vehicle driveability are in reality better accomplished as part of the first step 35, but are better understood together with the explanation just given with step 37 to reveal how the lock-up clutch 16 provides two potential candidate operating modes of the power unit 10 and 12 for each gear ratio in the gearbox 11. As can now be more fully appreciated, each of the first two steps 35 and 37 outputs one or more candidate operating modes for the power unit 10 and 12, and each candidate mode is in the form of ltS candidate operating speed calculated in step 35 together with its numerical code indicating the required gear ratio status of the gearbox 11 and the concurrently required engagement status of the lock-up clutch 16.

The next step 38 in the gearshift mode selection procedure removes from consideration all of the remaining candidate operating modes for the power unit 10 and 12 which cannot meet or exceed the value 39 of power currently being commanded by the accelerator pedal 23 and allied sensor 24. In order to execute this step 38 for the case of candidate operating modes established with the lock-up clutch 16 engaged (engine-only operating modes), the power curve 30 in FIG. 2 first associates a particular RPM value with the power command value 39. Next, only those candidate engine-only operating modes which equal or exceed this RPM value remain as candidate modes after the power requirement step 38. Thus ROM 40 in the ECM 14 explicitly stores the engine-only (E-O) power curve 30. Additional ROM space 41 in the ECM 14 stores the engine-converter (E-C) power curve like the curve 30 to thereby allow step 38 to also eliminate from further consideration all candidate operating modes which require the clutch 16 to be released and which have associated therewith by the engine-converter power curve like curve 30 a power value less than the current power command 39.

The power requirement step 38 retains one candidate operating mode for the power unit 10 and 12 even when the commanded power value 39 is so high that none of the remaining candidate operating modes will allow the power unit 10 and 12 to reach the commanded power 39. In this case, the single remaining candidate operating mode is chosen to be the one which approximates the commanded power 39 as closely as possible. This can be accomplished by selecting the highest power value obtained from the power curves 40 and 41 using the candidate operating speeds remaining after the overspeed requirement step 37. Alternatively, the highest candidate speed with the lock-up clutch 16 released is chosen in preference to the highest candidate speed with the clutch 16 engaged if and only if these two candidate speeds are equal; here again the overspeed requirement step 37 must be completed before making this choice.

The power requirement step 38 completes a process for eliminating all (or all except one) power unit 10 and 12 candidate operating modes which cannot safely achieve the current value 39 of commanded power output while the associated passenger car is traveling at the particular speed given by the current value 36 of gearbox output speed. Consequently an immediate change to a new operating mode of the power unit 10 and 12 is mandatory if the numerical identification code for the current operating mode is not found among the identification codes which the step 38 collectively supplies as one of the inputs shown in FIG. 3 for the first decision step 42. So that step 42 can make this determination, the current status 43 of the lock-up clutch 16 and the current status 44 of the gearbox 11 must also serve as inputs to the decision step 42. As shown in FIG. 3 by the "not found" designation at the lefthand side of decision step 42, step 42 immediately initiates the selection 45 of an appropriate new operating mode for the power unit 10 and 12 whenever a change in operating mode is mandatory.

This selection step 45 requires that the previous decision step 42 provide the identification codes (indicating required engagement status of the lock-up clutch 16 as well as required gear ratio status of the gearbox 11) for both the current operating mode of the power unit 10 and 12 and a single one of the candidate operating modes which remain after enforcing the power requirement of step 38. If there is a choice, this single candidate operating mode is chosen to be the one which has a calculated (in step 35) candidate operating speed for the power unit 10 and 12 closest to the existing power unit 10 and 12 operating speed. This determination does not require an input from the torque converter output RPM sensor 21 because the highest candidate speed is always chosen in the case of a mandatory upshift of the gearbox 11, and the lowest candidate speed in the case of a downshift. If there is the further choice of engagement status of the lock-up clutch 16, then engagement is chosen in preference to release. Mode selection step 45 initiates any required activation of the gearbox shift actuator 13 and of the lock-up clutch actuator 15, both of these actuators being shown in FIG. 3 in different symbolic form than in FIG. 1.

Whenever the mode selection step 45 does initiate a change to a new operating mode of the power unit 10 and 12, it simultaneously pauses before activating the resetting 46 of a performance deficit to zero. This pause gives the shift actuator 13 and lock-up clutch actuator 15 time to enable the new power unit operating mode before the mode selection procedure is begun anew. Reset step 46 does lead directly to a repetition of the entire gearshift mode selection procedure represented in FIGS. 3 and 5, but this entire procedure can be completed by the ECM 14 in a fraction of the time required by the actuators 13 and 15 to establish a new operating mode.

Before returning to the other possible outcome for the first decision step 42, it should be noted first that the current gearbox output speed status 36 is derived from the signal provided by the gearbox output RPM sensor 22 in FIG. 1, and that the current power command status 39 is derived from the signal generated by the accelerator pedal position sensor 24. Unlike these two status values 36 and 39, the lock-up clutch engagement status 43 and the gearbox active ratio status 44 do not absolutely require direct measurement using sensors. Instead, as just one example, the input actuation commands to the gearbox shift actuator 13 and the lock-up clutch actuator 15 can be used to update ROM dedicated to storing the lock-up status 43 and the gearbox status 44. Because several alternatives do exist, and to simplify the drawing, the sources of the lock-up status 43 and the gearbox status 44 are not shown in FIG. 3.

Next, it should be noted that the mode selection step 45 depends on the design of the gearbox 11, and even on the design of the lock-up torque converter assembly 12. As the first example of this requirement, establishing a new operating mode for the power unit 10 and 12 might require the shift actuator 13 to downshift the powershift gearbox 11 from its overdrive 4th gear ratio to its 2nd gear ratio. The mode selection step 45 should initiate a mandatory downshift from 4th gear directly to 2nd gear only if the gearbox 11 is of a type designed for this non-sequential downshift. Otherwise, the mode selection step 45 should downshift only to 3rd gear, and a downshift to 2nd gear will begin a fraction of a second after the pause of step 45 is completed for the downshift to 3rd gear. To expand this example, engaging the lock-up clutch 16 while maintaining the same active gear ratio in the gearbox 11 is herein defined to be a sequential upshift of mode because, like an actual upshift, it reduces both the operating speed of the engine 10 and the overall multiplication of torque produced by the engine 10. Similarly, releasing the clutch 16 while maintaining the same gearbox ratio is a sequential downshift of mode, but releasing the clutch 16 in combination with a sequential upshift of gear ratio in the gearbox 11 normally constitutes a sequential upshift of mode because the effect of the ratio change will normally predominate. More importantly, a sequential upshift in the gearbox 11 with the clutch 16 remaining engaged is in fact not sequential if operation with the clutch 16 released is acceptable in the new gear ratio. Since releasing the clutch 16 upon upshifting the gearbox 11 can help smooth the upshift, the mode selection step 45 might avoid upshifting the gearbox 11 without concurrently releasing the clutch 16, just as it might avoid a downshift from 4th gear directly to 2nd gear.

Returning now to the other outcome for the first decision step 42 in FIG. 3, the step 42 receives the identification codes for all candidate power unit 10 and 12 operating modes remaining after the power requirement step 38 is completed. From a slightly different viewpoint, all of the candidate operating modes provided to decision step 42 from the previous step 38 must lie on a topographical surface above either the cross-hatched area 31 in FIG. 2 or the corresponding area for the engine-converter data map unless only one mode remains as a candidate. This in turn means that, in the case of two or more candidate operating modes for this other outcome of decision step 42, each of the remaining candidate modes can satisfy the current power command value 39 while the associated passenger car is traveling at the particular speed corresponding to the current value 36 of gearbox output RPM. Since the current operating mode is found among the candidate modes for this outcome of decision step 42, any change in operating mode initiated by this outcome is purely elective, rather than mandatory as for the "not found" outcome of step 42. In contrast to mandatory mode changes, the elective changes will be aborted under appropriate circumstances to thereby reduce shift business of the powertrain components of FIG. 1.

For the elective outcome of decision step 42, one of the candidate operating modes remaining after step 38 will be the mode currently being used by the power unit 10 and 12, and one of these remaining candidate modes, quite possibly the same one, will be the best one in the sense of having the lowest modified fuel flow rate to the engine 10 while satisfying the current power command 39. The elective outcome of step 42 determines the modified fuel flow rate of the currently existing one of these two possibly identical operating modes, and the simultaneously-executed step 49 determines the modified fuel flow rate of the best operating mode. Therefore both of these simultaneous steps 42 and 49 receive from the power requirement step 38 all remaining candidate modes in the form of a candidate speed calculated in step 35 together with a corresponding identification code for lock-up clutch status and gearbox active ratio status. In contrast, the two power unit 10 and 12 operating modes simultaneously provided by steps 42 and 49 to the next step 50 have the form of a modified fuel flow rate and the corresponding identification code.

Each of the parallel steps 42 and 49 accesses the topographical power unit data maps represented by FIG. 2 in order to exchange the candidate operating speed of each candidate operating mode for a candidate value of modified fuel flow rate to the engine 10. More specifically, the step 49 locates for each remaining engine-only candidate operating mode a position on the plane of FIG. 2 using the applicable candidate operating speed and using a value of brake power output equal to the current value 39 of commanded power. With this position thus located, the portion 51 of ROM which stores the engine-only (E-O) data surface of modified fuel flow rate in the ECM 14 provides the corresponding value of modified fuel flow to be associated with the identification code for the candidate operating mode. For all remaining candidate operating modes having an identification code which specifies the released condition of the lock-up clutch 16, the step 49 applies exactly the same procedure except that the ROM portion 52 which stores the engine-converter (E-C) data map for the power unit 10 and 12 provides values of modified fuel flow rate. Step 49 selects the single lowest value from all of these candidate values of modified fuel flow rate and provides this lowest value, along with its numerical identification code, as one of two inputs to the next step 50.

The other input to step 50, of a single value of modified fuel flow rate and corresponding identification code, comes from the elective outcome of step 42. (In the case of the mandatory or "not found" outcome of the first decision step 42, the second decision step 50 receives no input from step 42 and is aborted, as is parallel step 49.) Since this elective outcome of step 42 uses the exact same procedure which the parallel step 49 uses to retrieve modified fuel flow rates from ROM, it also receives inputs from the current value 39 of commanded power and from the modified fuel flow rate data maps 51 and 52. However, the elective outcome of step 42 always makes just one determination of modified fuel flow rate, that given by the single candidate operating speed calculated in step 35 for the identification code which identifies both the current lock-up clutch status 43 and the current gearbox status 44.

The second decision step 50 uses the two input values of modified fuel flow rate from parallel steps 42 and 49 to calculate a modified rate at which fuel is currently being sacrificed by refraining from a change to the best operating mode selected by step 49. If the current operating mode of the power unit 10 and 12 is identical to the candidate operating mode selected by step 49 on the basis of minimum modified fuel flow rate, then the modified rate at which fuel is being sacrificed obviously equals zero. The equal-to-or-less-than-zero symbol on the lefthand side of step 50 indicates this outcome which activates the reset step 46 before beginning anew the entire gearshift mode selection procedure of FIGS. 3 and 5. Only by virtue of this activation of the reset step 46 are elective changes in operating mode of the power unit 10 and 12 aborted under appropriate circumstances to reduce shift business of the powertrain components of FIG. 1. The only other way the reset step 46 can be activated is by the step 45 after step 45 has already established the new operating mode.

The greater-than-zero outcome on the righthand side of decision step 50 does not always result when the current fuel flow rate from step 42 exceeds the minimum fuel flow rate from step 49. The decision step 50 does subtract the minimum rate of step 49 from the current rate of step 42, but this difference is then reduced by a small but significant hysteresis tolerance value before it is compared to zero for the determination of which outcome is to be selected for step 50. The resulting adjusted sacrifice in modified fuel flow rate serves as the input to begin step 53 only if the adjusted sacrifice exceeds zero, or in other words, only if the difference in modified fuel flow rates exceeds the hysteresis tolerance.

The summing step 53 adds any positive value of adjusted sacrifice in fuel flow rate from step 50 to the sum of all such values from previous iterations completed after the last execution of reset step 46. The resulting power unit performance deficit accrues at a variable rate until either the step 45 selects a new power unit operating mode or the current operating mode becomes nearly optimum due to change in the current power command 39 or in the current vehicle speed as indicated by the value 36 of gearbox output speed or in both together. This performance deficit serves as one input to the next step 54, and it in fact closely approximates a mathematical integration over time of the positive adjusted value of fuel flow sacrifice from step 50 because the execution of steps 35 through 54 always consumes the same number of clock pulses in the ECM 14.

Finally, step 54 compares the power unit performance deficit from step 53 to a variable threshold value generated in a special procedure 55 that will be considered next. Only when the power unit performance deficit from step 53 reaches or exceeds the threshold generated in the procedure 55 will the comparison step 54 terminate the growth of the performance deficit by activating step 45. Step 45 in turn requires the identification codes determined for the current and best power unit operating modes from parallel steps 42 and 49 respectively. The other outcome of threshold comparison step 54 is to continue the growth of the performance deficit by returning to the very beginning of the entire mode selection procedure without activating the reset step 46.

In again considering the idea of reducing the frequency of elective gearshifts executed by the powershift gearbox 11, it is now more clear that the effect of the calculation in step 50 of a varying magnitude indicative of the rate at which fuel is being sacrificed is to selectively vary the magnitude of hysteresis added to the gearshift schedule for the gearbox 11, and in fact to selectively add hysteresis to what can be called the modeshift schedule for the powertrain components of FIG. 1. Stated in different words, the hysteresis increases when it is available at a reduced cost in performance. Most importantly, the varying magnitude of this selective hysteresis clearly achieves a superior tradeoff between fuel economy and shift business. To further refine this tradeoff, the procedure 55 in FIG. 3 generates the varying magnitudes 58 and 59 shown in FIG. 4 for the threshold level which the power unit performance deficit must reach in order for an elective modeshift to be initiated by step 45.

(At this point, one might ask if there is really much need to reduce shift business in conventional passenger cars. In general, there is not, but only because the shift scheduling in current automatic transmissions does not impose the reduced engine speeds critical for optimum fuel economy. The use of reduced engine speed concurrently restricts the engine power output available without downshifting. Since the driver's demand for power must be satisfied when possible, extra gear shifting is the result.)

Figure 4:
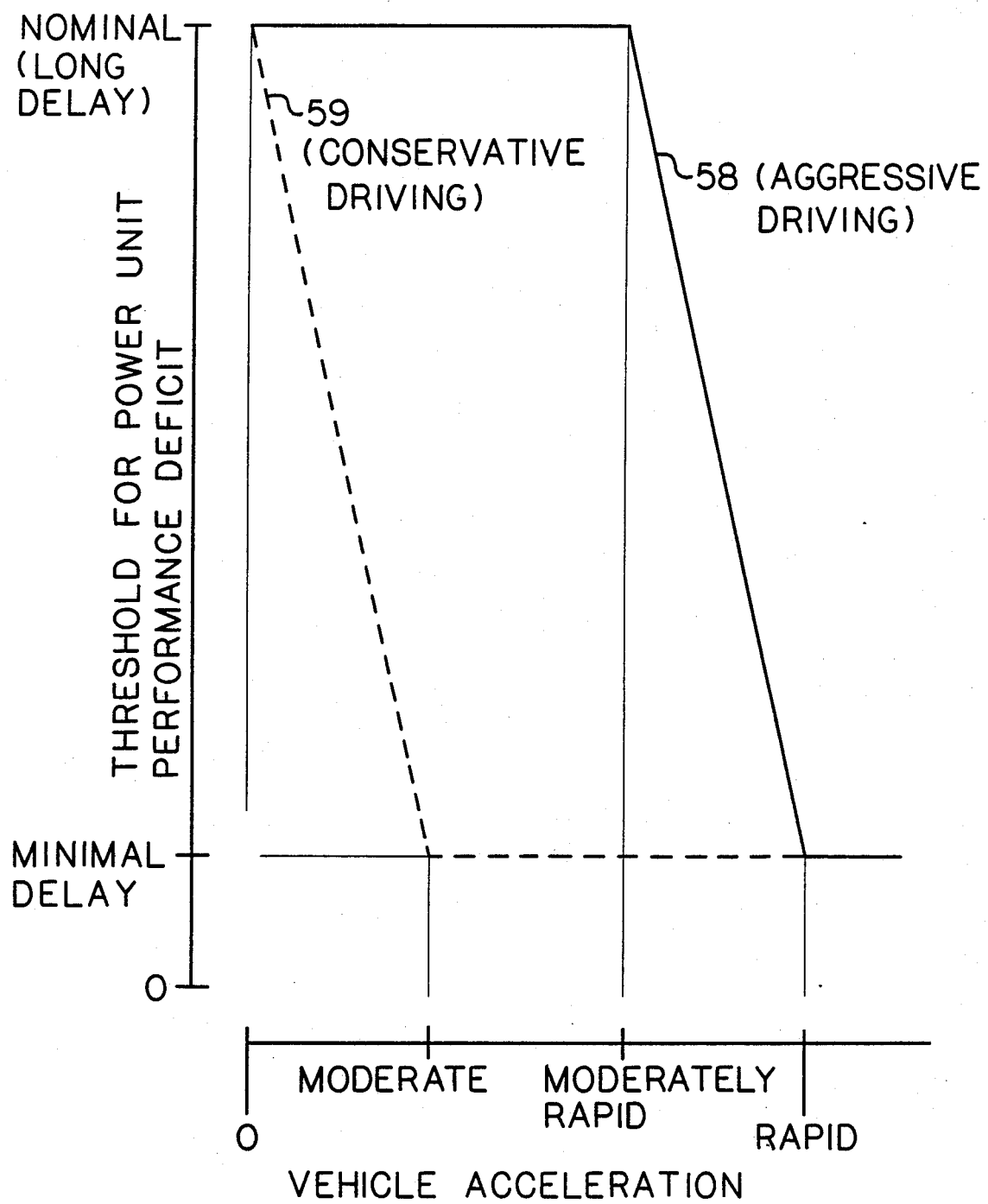
FIG. 4 shows the variation in a threshold value which influences, via the flow chart procedure of FIG. 3, gearshifts in the automatic transmission of FIG. 1.

As an introduction to FIG. 4, it is clear that acceleration of the associated vehicle changes the crankshaft speed of the engine 10 in the same direction as do downshifts executed by the gearbox 11. Therefore, sufficiently rapid vehicle acceleration largely eliminates any possibility that an offsetting downshift would follow an elective upshift executed without waiting for a relatively large power unit performance deficit to accrue. Accordingly in FIG. 4, the threshold function 58 for limiting the performance deficit begins a quick decrease to a minimal value when vehicle acceleration first reaches a moderately rapid magnitude. The resultingly earlier execution of upshifts by the gearbox 11 increases fuel economy and reduces engine noise, but with practically no extra risk that the earlier execution will cause any offsetting downshifts of the gearbox 11. In this way, upshift hysteresis is added only when it is really needed, that is, in the absence of significant value of vehicle acceleration.

While the steep drop in the threshold function 58 would often reduce the delay before an elective upshift is executed by the gearbox 11, it would not have the same effect on downshifts because rapid vehicle acceleration inherently eliminates the need for elective downshifts and because mandatory downshifts are never delayed. This apparent lack of efficacy in the case of downshifts is actually of little concern because the number of opportunities for executing elective downshifts is usually much less than that for elective upshifts. In fact, replacement of the torque converter 12 with a fluid coupling will, in combination with the fuel-air ratio calibration already described for the engine 10, totally preclude elective downshifts. In addition, delayed downshifts are more tolerable than delayed upshifts because they decrease, rather than increase, engine speed and noise.

Although the threshold function 58 reduces the delay preceding elective upshifts only during quite rapid acceleration of the associated vehicle, the resulting early execution of elective upshifts can also be appropriate at much more modest values of acceleration, as represented in FIG. 4 by the dashed lines of the alternate threshold function 59 for use during conservative driving of the associated vehicle. This second function 59 is derived from the original function 58 simply by continuing to use the function 58, but with vehicle acceleration being adjusted upward from the actual value 61 provided to the threshold generator 55 by differentiation of the gearbox output speed 36. (See FIG. 3. Such upward adjustment is established when the driver first selects a forward driving range for the gearbox 11 and whenever the gearbox 11 executes a power-off downshift. As will be evident from a discussion of FIG. 5, the threshold generator does receive a signal which distinguishes power-off downshifts from power-on downshifts. This strategy for activating the function 59 in effect makes an assumption after every significant power-off deceleration of the associated vehicle, and this assumption is that the associated vehicle will be driven conservatively.

If the foregoing assumption is incorrect, then it will be distinguished as such, for example, by the first power-on downshift executed by the gearbox 11 during at least moderate acceleration of the associated vehicle. Accordingly, the threshold generator 55 makes this distinction using the value 61 of vehicle acceleration and using the gearshift commands delivered to the shift actuator 13 as a result of the selection step 45 for new operating modes. Simultaneous detection of the requisite level of acceleration and a downshift of the gearbox 11 causes the threshold generator 55 to switch back to the first threshold function 58.

There is really no limit to the number of factors that can be utilized for more sophisticated adjustment of the time delay imposed on selective upshifts by the generator 55 of the threshold for the power unit performance deficit. As one example, the performance deficit could exceed the highest value shown in FIG. 4, but only when the adjusted sacrifice in fuel flow rate (from step 50 in FIG. 3) shows promise of reaching zero soon, that is, only when the adjusted sacrifice in fuel flow rate has a large negative slope with respect to real time. As another example, the minimal performance deficit would not return to the nominal value according to function 59 in FIG. 4 until the completion of an additional upshift. This modification would guard against a delayed upshift when the accelerator pedal 23 is partially released near the completion of a moderate acceleration of the associated vehicle from rest. As yet another example, the passage of a chosen amount of time can be used in addition to power-off downshifts to reset the delay from function 58 to function 59 in FIG. 4.

Considering now a few details of FIGS. 2, 3 and 4, neither of the threshold functions 58 and 59 ever descends to zero in FIG. 4, mainly to allow the threshold sufficient time to restore its nominal value in the event of a pronounced drop in the value 39 of commanded power. A decrease in the measured value 61 of vehicle acceleration is limited by the comparatively slow maximum rate at which the actuator 17 can close the engine throttle 18, and the threshold functions 58 and 59 in turn cannot rise back to the nominal value shown in FIG. 4 until the measured acceleration 61 decreases. In contrast, the step 50 calculates a new, much higher value for the current sacrifice in fuel flow rate very soon after the power command 39 drops. This new, relatively high sacrifice in fuel flow rate would cause the power unit performance deficit to rise almost instantly above a zero threshold value, but the threshold value for minimal modeshift delay in FIG. 4 accommodates high values of sacrifice in fuel flow rate for a brief time until the measured value 61 of vehicle acceleration can reflect the drop in commanded power 39.

Another detail concerns what happens when none or only one of the candidate operating modes satisfies the power requirement of step 38. In either of these cases, the step 50 for computation of the sacrifice in fuel flow rate will not be reached unless the current power unit operating mode is identical to the single candidate operating mode remaining after step 38. With these two operating modes thus being identical for step 50, subtracting the modified fuel flow rate of one operating mode from that of the other always gives the same result of zero regardless of the particular magnitude of modified fuel flow rate subtracted from itself. This in part justifies the adoption of an arbitrary magnitude for the single value of modified fuel flow rate assigned to both of the area 32 in FIG. 2 and the corresponding area for engine-converter data. The remainder of the justification is that a gearshift to an operating mode in the area 32 always occurs as the mandatory outcome of step 42 to thereby abort step 50. In reality, both of these criteria also characterize the topmost portion of the cross-hatched area 31 as determined by the narrowest ratio gap for the gear ratios in the gearbox 11.

The next detail concerns the adjustment in step 50 of the advantage in modified fuel flow rate associated with a modeshift to the best candidate operating mode. This addition of a modest amount of hysteresis to the modeshift schedule for the powertrain components of FIG. 1 allows for the performance of the power unit 10 and 12 to deviate somewhat from the engine-only data 40 and 51 and the engine-converter data 41 and 52. As perhaps the best example of such performance deviation, the use of substandard fuel would cause a knock sensor on the engine 10 to reduce ignition spark advance and hence power output from the engine 10. Even such a moderate reduction in power output would encourage the driver to slightly increase the commanded value 39 for power output, and this increase could in turn occasionally cause the gearbox 11 to downshift. The substantial BMEP reduction precipitated by downshifting relieves autoignition, thus allowing a return to normal spark advance and power output. In other words, the downshift would, by restoring power output, cause the driver to return to the original position of the accelerator pedal 23, but the original gear ratio would still map to a slightly better modified fuel flow rate in the data stored in ROM of the ECM 14. The small amount of hysteresis effectively added in step 50 prevents the upshift back to the original ratio and thereby precludes continuing repetition of first a downshift and then the offsetting upshift. This small amount of hysteresis similarly accommodates power output variations arising from varying operating temperature of the engine 10 and of the fluid in the torque converter 12.

Another detail follows from the fact that the modified mass flow rate of fuel to the engine 10 will normally remain at quite low values along the entire width in FIG. 2 of the zero power output level. This is especially true if the modified mass flow rate is heavily biased toward fuel economy, and the resultingly low values computed in step 50 (before adjustment for hysteresis) for the sacrifice in fuel flow rate can cause excessive delays to precede upshifts of the gearbox 11. To solve this problem, the modified fuel flow values along the lower edge of area 31 in FIG. 2 should be adjusted appropriately, or alternatively, the hysteresis adjustment in step 50 can be phased out only when the value 39 of power command approaches zero. In addition, the threshold generator 55 should suppress the threshold limit for the power unit performance deficit whenever the power command 39 approaches zero. FIG. 3 does show the required input of the power command 39 to the threshold generator 55.

Yet another detail pertains to an optional use for the measured value 61 of vehicle acceleration. Although the power peak 33 in FIG. 2 provides a reasonably good engine speed limit for initiating mandatory upshifts of the gearbox 11, a somewhat lower speed limit is desirable for downshifts, especially those which accompany any positive acceleration of the associated vehicle.

A few more details related to FIGS. 3 and 4 address differences between gearshifts executed by the gearbox 11, on one hand, and release or engagement of the lock-up clutch 16 in the torque converter assembly 12 on the other. Most importantly, light torque loading across the converter assembly 12 greatly reduces the change in crankshaft speed which engagement of the lock-up clutch 16 brings about. In contrast, light torque loading often has little effect on the engine speed change precipitated by a gearshift of the gearbox 11, and in fact no effect when the lock-up clutch 16 remains engaged throughout the gearshift. This difference suggests further advantages of allowing engagement of the clutch 16 only under light torque loads. First, the clutch 16 could utilize an inexpensive and lightweight design, but still provide long service life. And second, the clutch 16 would not require extra apparatus, such as a hydraulic accumulator, for tailoring its engagement pressure to a broad range of torque loading. Disengagement of the clutch 16 can, however, occur at heavy torque loads without compromising the foregoing advantages.

If engagement of the lock-up clutch 16 is to be restricted to light torque loading, then engagement should occur before the final upshift of the gearbox 11 into 4th gear because the rather extreme overdrive ratio of 4th gear usually requires greater than light torque loading across the converter 12 just to maintain a constant cruising speed of the associated vehicle. The 1st and 2nd gear ratios in the gearbox 11 are also generally incompatible with light torque loading because the driver usually maintains at least modest acceleration until the gearbox 11 upshifts to 3rd gear. Another reason why only 3rd gear may be acceptable for engagement of the clutch 16 is that an overrunning clutch is commonly used in four-speed planetary gearboxes to smooth the 3rd to 4th gear upshift, but not the 2nd to 3rd gear upshift, which may thus require the full cushioning effect of the torque converter 12 as available only with its clutch 16 released.

The foregoing considerations dictate an upshift sequence of 1R to 2R to 3R to 3E to 4E for candidate operating modes of the powertrain components of FIG. 1, where the numeral indicates the gear ratio in the gearbox 11, R indicates the released state of the lock-up clutch 16 and E indicates that clutch 16 is engaged. The first step 35 in FIG. 3 could, for the sake of simplicity, use the reverse order of the above sequence as its downshift sequence. During cold operation of the engine 10, step 35 could further omit the 3E and 4E candidate operating modes, and a brake application switch could be used to provide an overriding release signal to the lock-up actuator 15. Such a brake switch is necessary to guard against stalling of the engine 10 in the case where the gearbox 11 has only a front hydraulic pump. Reengagement of the clutch 16 would occur immediately upon removal of the brake override signal, that is, in the interval when the driver moves his foot from the brake pedal back to the accelerator pedal 23. Only a light torque load would oppose engagement of clutch 16 during this interval unless the driver had both pedals depressed simultaneously. To handle this last eventuality, the brake switch would also override any non-zero value of the commanded power 39.

In addition to the permanent exclusion in step 35 of operating modes 1E, 2E and 3E, inexpensive and lightweight design of the lock-up clutch 16 further requires that the comparison step 54 totally ignore the performance deficit from step 53 for only the upshift from operating mode 3R to mode 3E. Instead, the step 54 would use inputs from the RPM sensors 21 and 22 (shown in FIG. 1 and repeated in FIG. 3) to immediately implement the engagement of clutch 16 only when the sensors 20 and 21 indicate a sufficiently small RPM loss across the converter assembly 12. This RPM loss can be a fixed percentage of the converter 12 input RPM, or it can be a function of the converter input RPM. For the downshift from mode 3E to mode 3R, the step 54 reverts back to using the performance deficit from step 53, but torque converter losses make it unlikely that this downshift will ever be elective.

If the lock-up clutch 16 is of a type which can easily accommodate engagement under higher torque loading, then the threshold comparison step 54 should use both of the performance deficit from step 53 and the RPM loss indicated by the sensors 20 and 21 in selecting engagement of the lock-up clutch 16. From a slightly different viewpoint, immediate engagement of the clutch 16 is always justified by a sufficiently small RPM loss across the converter 12 because early engagement will as a result ensure extra smoothness and reduced clutch wear. The requisite more costly design of the clutch 16 would be acceptable in applications where the torque converter 12 is used to help bridge extra-wide gearbox ratio gaps. For example, the torque converter lock-up clutch in some truck transmissions is cycled into and out of engagement at nearly every upshift of gear ratio to thereby split the gear ratio gaps much as would a two-speed drive axle.

In passenger cars, however, low cost and smoothness of operation together have more importance than does an extra-wide transmission ratio range. Even so, the previous downshift sequence for passenger cars of 4E to 3E to 3R to 2R to 1R could be modified to maintain engagement of the lock-up clutch 16 during downshifts of the gearbox 11 from 3rd gear to 2nd gear. Because only 3rd gear is generally compatible with light load engagement of the lock-up clutch 16, the original unmodified upshift sequence of 1R to 2R to 3R to 3E to 4E would be combined with the new downshift sequence of 4E to 3E to 2E to 2R to 1R. Another reason for engaging the clutch 16 only in 3rd gear, while at the same time allowing the 3rd to 2nd gear downshift with the clutch 16 locked-up, is that a locked-up downshift between two gear ratios may be easier to execute smoothly than is the locked-up upshift between the same two ratios. Consequently, the first step 35 in FIG. 3 would not include the 2E operating mode as an extra candidate operating mode until the clutch 16 became engaged. Upon release of the clutch 16, the extra 2E mode would again be excluded from the candidate modes of step 35. (Inefficiency in the torque converter 12 will usually inherently exclude the 3R mode in favor of the extra 2E mode for an elective downshift from the 3E mode.) The input of the existing lock-up status 43 to the step 35 for implementing this optional approach is shown dashed in FIG. 3, and the mode selection step 45 would smooth the 2nd gear to 3rd gear upshift by allowing the first upshift from mode 2E to be only in sequence to mode 3R. Which is to say that release of the lock-up clutch 16 would accompany initiation of the 2nd to 3rd gear upshift in the gearbox 11.

This modified approach, as just explained, will commonly compare the extra operating mode 2E as the current mode to mode 3E or 4E as the best candidate mode. Allowing the first upshift in sequence from mode 2E toward mode 3E or 4E to occur as soon as the power unit performance deficit first reaches the threshold limit in comparison step 54 will, however, often result in an early upshift because mode 3E cannot be obtained from mode 3R until the torque converter 12 is lightly loaded. Even though this early upshift will still allow the extra 2E mode to improve fuel economy, it can usually be avoided successfully by forcing step 54 to make the upshift comparison of mode 2E only to mode 3R. This in turn requires that step 35 exclude candidate modes 3E and 4E when mode 2E is the current operating mode. The danger here is that mode 3R may seldom or never be better on an elective basis than mode 2E due to inefficiency of the unlocked torque converter 12. As illustrated by this modification, step 35 can be used to temporarily exclude the computation of a performance deficit based on a particular candidate operating mode, in addition to temporarily excluding selection in step 45 of the mode. In comparison, step 45 is used to temporarily exclude only the selection of a particular operating mode until, for instance, modeshifting has begun in sequence.

Figure 5:
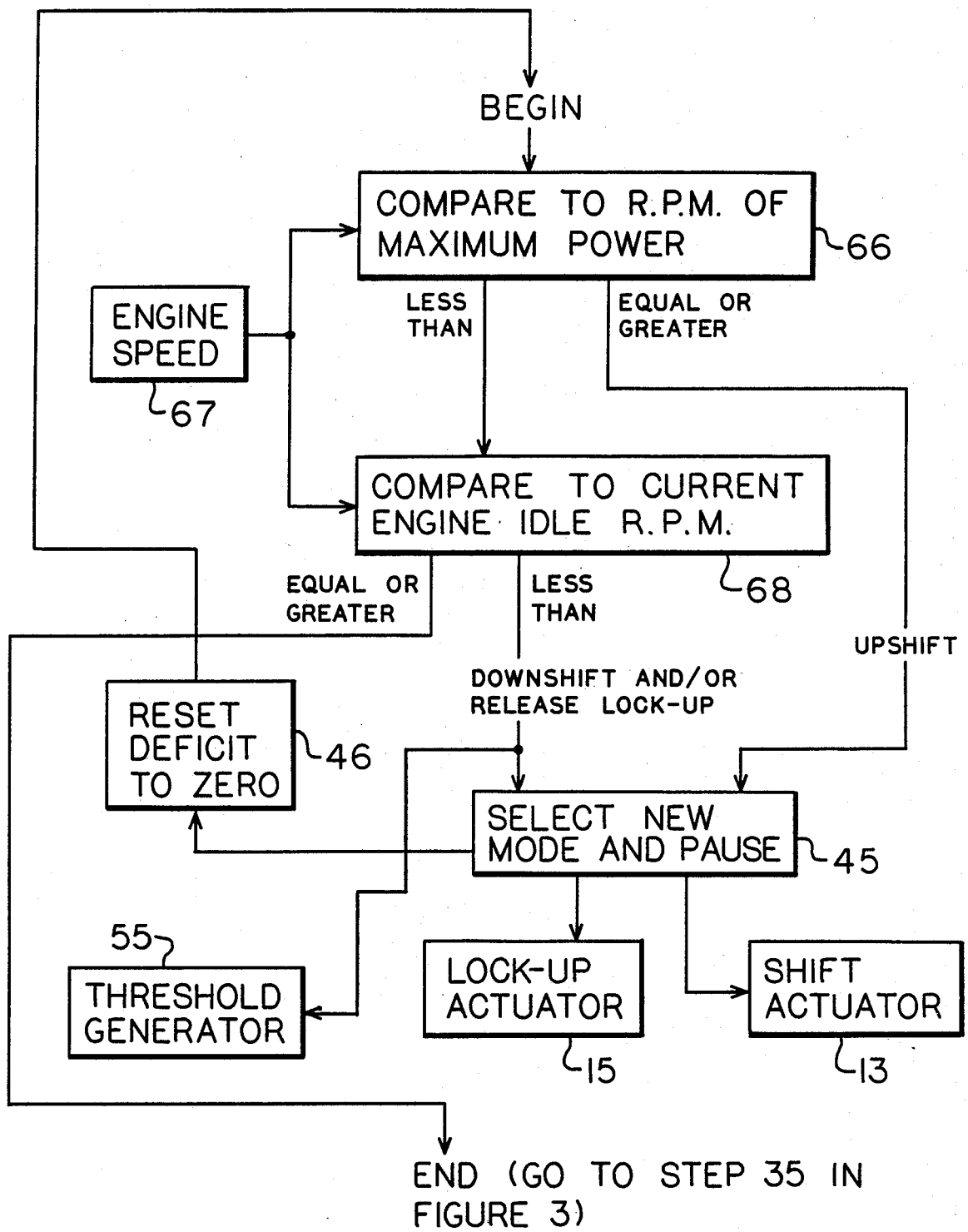
FIG. 5 presents another flow chart continuously repeated by an electronic control system for the torque converter and transmission of FIG. 1.

As an introduction to FIG. 5, the flow chart of FIG. 3 governs all elective modeshifts for the powertrain components of FIG. 1, but not all of the mandatory modeshifts. FIG. 5 is therefore a flow chart for the remaining mandatory modeshifts.

As shown by considering FIGS. 3 and 5 together, the ECM 14 always begins the flow chart of FIG. 3 by first executing the steps of FIG. 5. When the pause of step 45 in FIGS. 3 and 5 is executed, the resulting delay precedes step 66 in FIG. 5 directly, and step 35 in FIG. 3 only indirectly. Thus, step 66 is the beginning of the entire procedure represented by FIGS. 3 and 5 together.

This comparison step 66 in FIG. 5 serves as a backup to the engine overspeed protection provided by step 37 and the "not found" outcome of step 42 as already explained with reference to FIG. 3. Step 66 does provide added overspeed protection because it relies on the current engine speed value 67 derived from a different RPM sensor 20 and because this sensor 20 measures crankshaft speed of the engine 10 directly, rather than being dependent on factors such as complete filling of the torque converter 12 with fluid. To allow for normal variation in performance of the converter 12, the engine RPM limit imposed in step 66 should be somewhat higher than the limit imposed in the overspeed requirement step 37 of FIG. 3; otherwise spontaneous oscillating shifting of the gearbox 11 could occur.

In the rather unlikely event that crankshaft speed of the engine 10 does exceed the limit set by step 66, the equal-to-or-greater-than outcome of step 66 will initiate the selection 45 (repeated from FIG. 3) of a new operating mode for the power unit 10 and 12. For this outcome, the selection step 45 always controls the lock-up actuator 15 and the shift actuator 13 (both also repeated from FIG. 3) to produce an upshift which is in sequence. If the lock-up clutch 16 is to be engaged only under light torque loading, as explained previously, then this further requirement would seem to preclude any upshift from the 3R mode initiated by either step 66 of FIG. 5 or step 37 of FIG. 3. This would be a problem were it not for the fact that the 3rd gear ratio in the gearbox 11 follows conventional automotive practice by allowing the associated passenger car to reach nearly its normal maximum speed with the clutch 16 released.

The other, more normal outcome of step 66 is simply to advance to the next comparison step 68, which initiates the selection 45 of a new operating mode only if the current value 67 of engine speed threatens to fall below its idle level. The idle speed value used in step 68 preferably does not remain constant, but instead tracks variations induced in the actual idle speed of the engine 10 to accommodate cold engine operation and any other factors. In addition, the idle speed used in comparison step 68 should always remain at least a little above the single value of idle speed shown in FIG. 2 for the engine-only curve 30 obtained with the engine 10 at normal operating temperature. This last criterion guarantees that the step 68 will initiate all power-off downshifts and thereby initialize the threshold generator 55 to the threshold function 59 in FIG. 4 after each power-off downshift.

When step 45 is activated by step 68, it always initiates a downshift which is in a chosen power-off sequence, for instance a downshift within the chosen order 4E to 3E to 3R to 2R to 1R. The mode selection step 45 will nevertheless initiate gear ratio downshifts of the gearbox 11 even if a brake pedal override switch releases the lock-up clutch 16 to precipitate an operating mode not within the chosen order, for example mode 4R in the case of the above order for sequential downshifting.

If neither of the comparison steps 66 and 68 activates the selection 45 of a new operating mode, step 35 in FIG. 3 is executed without delay. Regardless of whether the selection 45 of a new operating mode is activated by step 42 or 54 of FIG. 3 or step 66 or 68 of FIG. 5, the selection step 45 always activates the reset step 46. Step 66 in FIG. 5 is always the first comparison step undertaken after step 45 completes the change to a new operating mode. And finally, the execution of steps 66 and 68, when leading directly to step 35, always consumes the same number of clock pulses in the ECM 14. This enhances the accuracy with which the summing step 53 approximates an integration over time of the sacrifice in modified fuel flow rate.

To summarize the gearshift mode selection procedure represented by FIGS. 3 and 5 together, this procedure can be viewed as choosing an operating mode in response to the particular power level 39 currently being commanded by the accelerator pedal 23 and associated sensor 24. From a slightly different perspective, this procedure selects from the available operating speeds for the engine 10 and torque converter 12, the operating speed most appropriate for establishing the current power command 39 at the existing gearbox output speed 36. In addition to operating speed the torque output from this power unit 10 and 12 must also be regulated in order for its power output to be in concert with the power level 39 currently being commanded. This second function of the ECM 14 is represented in the flow chart of FIG. 6 for control of the engine throttle 18 via its associated actuator 17 and position sensor 19. Like the gearshift mode selection procedure, the throttle control procedure is repeated many times each second by the ECM 14, but there is no absolute requirement for synchronization between the steps of these two main procedures.

Figure 6:
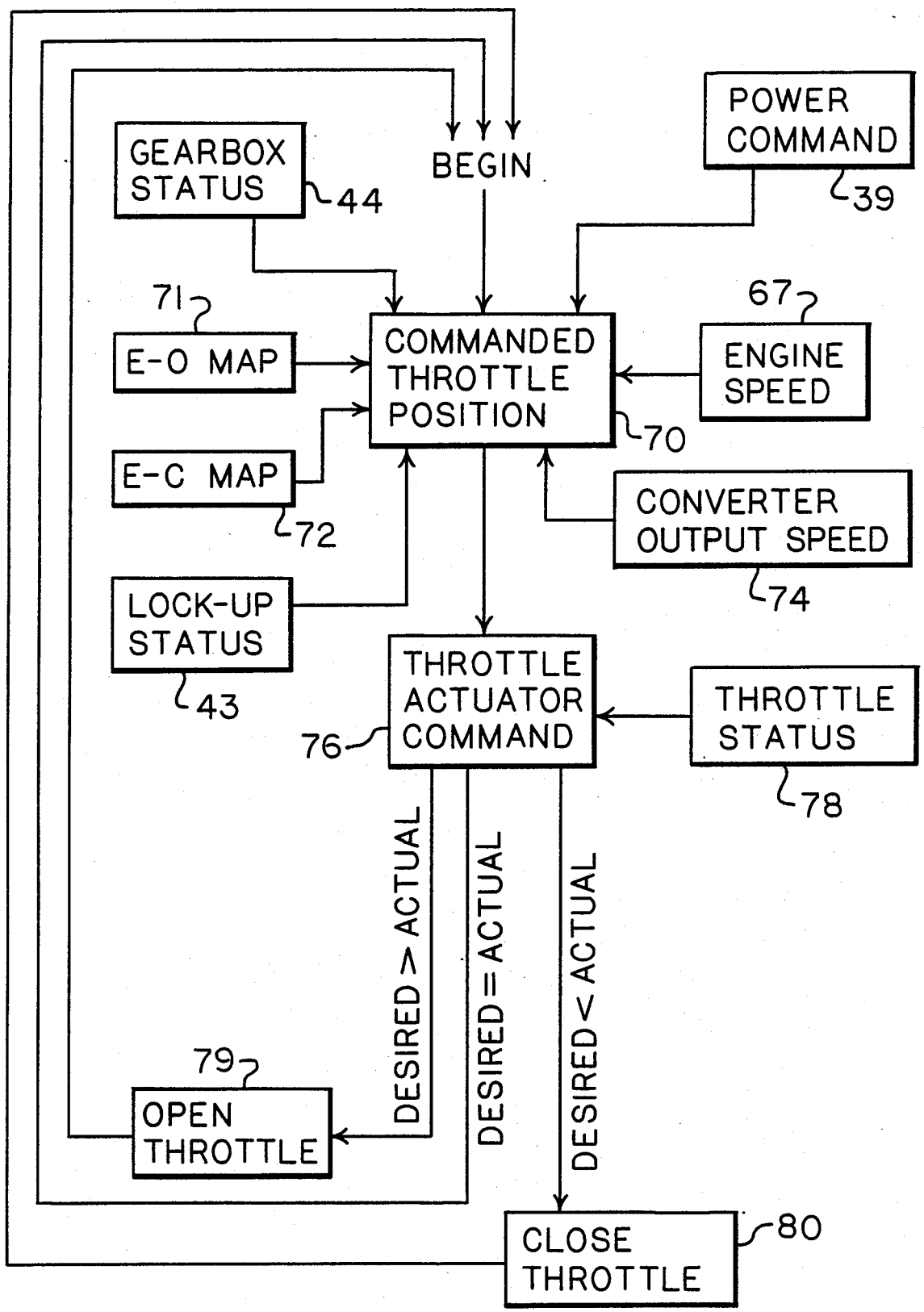
FIG. 6 shows a flow chart continuously repeated in controlling the throttle valve of the gasoline engine in FIG. 1.

To perform the first step 70 in FIG. 6, the ECM 14 requires data from an engine-only (E-O) map 71 and an engine-converter (E-C) map 72, but these maps 71 and 72 are maps of position of the engine throttle valve 18, as distinct from the maps 51 and 52 of modified fuel flow rate in FIG. 3. The maps 71 and 72 are of course like the maps 51 and 52 in that they are part of the topographical data surfaces represented by FIG. 2 and are stored in ROM of the ECM 14.

If the current lock-up status 43 indicates that the lock-up clutch 16 is engaged, then according to step 70 the ECM consults its engine-only data map 71 using as inputs the current engine speed 67 (as derived from either sensor 20 or sensor 21 in FIG. 1) and the commanded power level 39. As a result, the step 70 secures from the E-O map 71 the position of the throttle 18 required to establish the commanded power level 39 at the existing engine speed 67. Since the lock-up clutch 16 is now engaged and the gearbox 11 is by itself quite efficient, the power provided at the output shaft of the gearbox 11 will closely approach the power actually being developed by the engine 10. However, both of the maps 71 and 72 can advantageously be adjusted at low engine torque levels to help compensate for some of the roughly constant parasitic torques in the gearbox 11.

If the lock-up clutch 16 is released, then only the engine-converter data map 72 will accurately describe power available at the input shaft of the gearbox 11 as a function of position of the throttle 18 and of current speed of the output shaft of the torque converter 12. Accordingly in this case, the step 70 obtains the desired position of the throttle 18 by consulting the engine-converter map 72 using the same power command 39, but using the current speed 74 of the torque converter output shaft as derived only from the sensor 21 in FIG. 1. The step 70 then provides the desired position of the throttle 18 to the next step 76 in FIG. 6, regardless of whether this throttle command comes from the E-O map 71 or the E-C map 72.

This next step 76 should obviously issue an opening command 79 to the throttle actuator 17 when the desired throttle opening exceeds the actual throttle opening 78, and a close throttle command 80 when the situation is reversed. Each of these throttle actuator commands 79 and 80 leads directly back to the first step 70 in FIG. 6, as does the step 76 itself in the event that the desired and actual throttle positions are equal. The actual throttle position 78 is derived from the throttle position sensor 19 in FIG. 1, and the ECM 14 can of course utilize known control system techniques, such as proportional-integral-derivative control, in carrying out step 76. Thus the open and close throttle commands 79 and 80 can have varying magnitudes which in turn cause the speed of the throttle actuator 17 to vary appropriately.

The foregoing throttle control procedure as implemented by the flow chart of FIG. 6 requires a modification in order to avoid abrupt response to movement of the accelerator pedal 23 when the associated vehicle is first driven away from a stop. The fact that the converter output speed sensor 21 indicates zero RPM at rest of the vehicle means that even the wide open position of the throttle 18 will deliver zero power to the torque converter output shaft at this instant. Consequently even moderate depression of the accelerator pedal 23 will tend to cause abrupt opening of the engine throttle 18 when the associated vehicle is stopped or traveling at very low speed.

In contrast to the zero power condition at the torque converter's output shaft, its input shaft will accept a significantly wide range of power input as a function of engine throttle position when the associated vehicle is completely stopped. This fact clearly suggests the following solution, which is implemented only when the gearbox 11 is in 1st gear and the lock-up clutch 16 is simultaneously in its released state. Under these two conditions, the step 70 in FIG. 6 should retrieve a "normal" throttle command from the engine-converter map 72 in the entirely normal way using the converter output speed 74. Since this normal throttle command will often be excessive due to low values of the converter output speed 74, the step 70 should also retrieve a "fictitious" throttle command still using the E-C map 72, but now using the converter input speed (identical to the engine speed 67) multiplied by a crossover factor of roughly 65%. The less open of these two throttle commands should be advanced to the step 76 for use as the desired throttle position. Or more simply, the step 70 should just use the higher of converter output speed 74 and 65% of converter input speed 67 to consult the E-C map 72; this also simplifies the E-C map 72 by making all data below 65% of the lowest engine idle speed unnecessary.

Multiplication of the converter input speed 67 by the crossover factor of 65% causes the resulting reduced speed to equal the converter output speed 74 when the torque converter 12 has an efficiency of 65% from the standpoint of speed; actual efficiency will normally be higher. As a consequence of this speed equality, the normal and fictitious throttle commands also become equal at this point, and the step 70 will therefore crossover, without any discontinuity in throttle command, from the fictitious throttle command to the normal throttle command when the converter speed efficiency first reaches 65%.

The crossover factor should be low enough to ensure that crossover will have occurred before either the gearbox 11 upshifts to 2nd gear or the lock-up clutch 16 engages. A relatively low value for the crossover factor, and consequently for efficiency of the torque converter 12, does serve this purpose because an upshift executed at already marginal converter efficiency would precipitate a large additional dropoff in efficiency, and because engagement of the lock-up clutch 16 is not very practical during large differences between input and output speeds of the converter 12. On the other hand, a higher value for the crossover factor will enhance the effectiveness of the present modification in solving the problem of abrupt throttle opening. If in fact the throttle action is still too abrupt, attenuation of the power command 39 at low vehicle speed will successfully complement the modification just explained.

The foregoing modification is also effective in variations of the present invention which use more advanced automatic transmissions. As an example of an advanced transmission, an additional gear ratio would allow a fluid coupling to replace the torque converter of current automatic transmissions without a loss in the overall torque multiplication range, but with an improvement in efficiency. Further improving efficiency would be an arrangement which by-passes all power around the fluid coupling upon upshifting of the transmission to 2nd gear, so that only 1st gear would have fluid coupling losses. Such a transmission would make engine-coupling data largely unnecessary, and abrupt throttle response would inherently be avoided by always using crankshaft speed to consult the engine-only data. However, the upshift to 2nd gear would, by terminating fluid coupling losses, cause a discontinuity in power output. A way of preventing this discontinuity is to always initiate the upshift to 2nd gear when coupling speed efficiency reaches a threshold, say 80%. In other words, coupling efficiency would always be 80% at the time of the upshift, so that multiplying the commanded power level by the inverse of 80% only while in 1st gear would exactly offset coupling losses which exist at the time of the upshift. Attenuation of the commanded power level at low vehicle speed may still be used in conjunction with this technique.

Another modification concerns all of FIGS. 2, 3 and 6. As suggested by FIG. 2, the FIG. 3 engine maps 51 and 52 of fuel flow should be terminated at the zero power level even though the idle position of the throttle 18 will cause negative engine power output at crankshaft speeds above the idle speed. If the FIG. 6 engine maps 71 and 72 of throttle position are similarly terminated, then engine braking will not be available. To remedy this shortcoming, the throttle position maps 71 and 72 can be appropriately adjusted at low power levels so that the idle position of the throttle 18 always maps to the zero level of commanded power output.

This adjustment of data values should of course have minimal impact on the rest of the data and at the same time avoid causing any discontinuity in the data.

Concentrating now on operation of the present invention, fuel economy is what distinguishes the invention when a broad viewpoint is taken. My copending application Ser. No. 145,568 presents details explaining why synergism results when the special fuel-air ratio calibration already described for the engine 10 is combined with the discrete-ratio gearbox 11 and the drive-by-wire control implemented by the ECM 14 together with all of its associated sensors and actuators.

To focus more narrowly on the gearshift mode selection and throttle control procedures represented in the flow charts of FIGS. 3 and 6, the step 49 in FIG. 3 is recognized as selecting the best operating mode of the power unit 10 and 12 as a function of measured values 36 and 39 indicative of vehicle speed and commanded power, but this selection is made without regard to shift busyness. Iteration of this step 49 can therefore be used to generate a map of the "best" operating mode for the powertrain components of FIG. 1 as a function of the full range of values for the commanded power 39 and for the gearbox output speed 36. U.S. Pat. No. 4,353,272, assigned to Robert Bosch GmbH, gives a much narrower and less precise method for calibrating such a transmission shift map. In comparison to the Bosch approach using a shift map, the present invention (1) reduces shift busyness, (2) accommodates reduced engine exhaust emissions, (3) accounts for torque converter losses and (4) avoids engine performance losses that arise from imprecise location of the boundary lines which separate the various gear ratios on the shift map. Only the first of these advantages relies to any extent on using continuous comparison of different candidate values of modified fuel flow rate in lieu of a shift map. Which is to say that iterating only through step 49 in FIG. 3 constitutes an improved method for calibrating the Bosch shift map.

Nevertheless the step 50 in FIG. 3 could be included in the iteration used to generate a transmission shift map basically like that of the Bosch Pat. No. 4,353,272. The equal-to-or-less-than-zero outcome on the lefthand side of step 50 in FIG. 3 would, in combination with a difference between existing and minimum fuel flow rates, delineate areas of first-order hysteresis in which the existing operating mode would be retained indefinitely. For example, an area of first-order hysteresis separating 2nd and 3rd gear on the shift map would retain 2nd gear if entered from the 2nd gear area on the map, and 3rd gear if entered from the 3rd gear area.

To further define this shift map, the greater-than-zero outcome on the righthand side of step 50 can delineate areas on the shift map where retaining the existing operating mode for a limited amount of time is acceptable. These areas of second-order hysteresis thus require not only that the greater-than-zero outcome of step 50 be included in the iteration, but also that the actual magnitude of this outcome be less than a value appropriately selected in view of the chosen time delay. An even shorter time limit for delaying the selection 45 of a new operating mode could delineate third-order hysteresis, and so on.

To take a slightly different viewpoint, all of the greater-than-zero outcomes of step 50 up to a limiting value can be lumped together to accrue at the same rate in step 53. While this approach is not as refined as that of the preferred embodiment, it does illustrate that the input to step 53 in FIG. 3 need not come from step 50 and its supporting steps, but alternatively can come from a shift map having several orders of hysteresis. (Higher orders of shift map hysteresis would inherently accrue in step 53 at higher rates because they are assigned to higher representative values of the sacrifice in modified fuel flow rate. As the limiting case for infinitely many orders of hysteresis, actual values of the sacrifice in fuel flow rate may be stored on the shift map of commanded power versus gearbox output RPM.)

Even if step 50 and its preceding steps in FIG. 3 were to be replaced by a shift map with two or more orders of hysteresis, steps 53 and 54 would still perform the critical function of either (1) initiating selection of the new operating mode to thereby terminate the sacrifice in fuel flow rate or (2) postponing selection of the new operating mode. The postponement would in turn eventually lead to one of three possible conclusions: (1) the selection of a new operating mode via an equivalent of the not-found outcome of step 42, (2) return of the existing operating mode to the status of best mode as equivalent to the resetting 46 of the performance deficit to zero via the lefthand outcome of step 50 or (3) selection of the new mode because the threshold has been reached in step 54. The first of these conclusions can certainly occur using a transmission shift map without also using steps 53 and 54 from FIG. 3. The same is true of the second conclusion because, as noted in the Bosch Pat. No. 4,353,272 the very purpose of hysteresis on a shift map is to help eliminate excessive gearshifting. Even the third conclusion is not unique to the present invention because the fuel sacrifice from step 50 could conceivably be so large as to exceed the threshold in step 53 on the very first iteration, to thereby prevent a variable waiting period during which the existing operating mode might regain the status of being optimum.

What really distinguishes an important aspect of the present invention is not merely that some gearshifts are eliminated by waiting for the sacrifice in fuel flow to decrease on its own, but that the period of time for waiting is limited by the accumulation in step 53 of fuel flow sacrifice values from successive iterations over time. (Step 54 imposes the limit.) This time limit allows waiting during periods when the sacrifice in modified fuel flow rate is far too large to justify an indefinite period of waiting, and the time limit therefore greatly extends the range of fuel flow sacrifice over which waiting is practical.

For example, if the current fuel economy is 20 miles per gallon during level ground cruising at 45 miles per hour in 3rd gear, and 20.2 MPG is available using 4th gear under otherwise identical conditions, then fuel is being sacrificed at a rate of 0.135 pounds per hour. A hysteresis adjustment of 0.15 pounds per hour in step 50 would prevent any accumulation of values in step 53 due to this sacrifice in fuel flow rate, and in fact would continually activate the resetting 46 of the performance deficit to zero via the lefthand outcome of step 50. Most importantly, fuel would continue to be sacrificed at the rate of 0.135 pounds per hour for just as long as the vehicle operating conditions were to remain unchanged. The apparatus disclosed in the Bosch Pat. No. 4,353,272 can cause exactly this same effect of an indefinite waiting period when an area of hysteresis is entered on the Bosch transmission shift map.

In contrast, a constant sacrifice of 0.20 pounds of fuel per hour would exceed the above hysteresis adjustment of 0.15 to thereby cause the accumulation in step 53 of a value of 0.05 during each iteration of the flow chart of FIG. 3. The finite threshold limit imposed in step 54 on this accumulation would obviously prevent an indefinite waiting period during which the sacrifice in fuel flow rate could remain at 0.20 pounds per hour.

Nevertheless, the accumulation in step 53 of various values of the adjusted sacrifice in fuel flow rate is not essential for imposing a variable limit on the time period during which sacrifice in the modified fuel flow rate is tolerated in the expectation that the sacrifice may soon decrease on its own. (It is trivial to impose a constant time limit because that can be done simply by adding a constant time delay to precede all the gearshifts indicated by a shift map.) A shift map with several orders of hysteresis proves this point. Since higher orders of hysteresis would be assigned to greater sacrifices in the modified fuel flow rate, they would also be assigned to shorter time delays preceding gearshifts. Which is to say that the order of an area of shift map hysteresis correlates to the magnitude of the concurrent sacrifice in engine performance, and this correlation is itself a second major aspect of the novelty of the present invention. In addition, the variable amount of the time delay before initiating a gearshift would still be dependent upon some measure of a sacrifice in modified fuel flow rate.

As already suggested, the present invention retains the first aspect of novelty even when a shift map replaces all of the steps preceding step 53 in FIG. 3, and even if this shift map includes many of the various magnitudes that the step 50 would ever calculate for the fuel flow sacrifice. Such inclusion of these magnitudes on a shift map would nevertheless in of itself distinguish this variation of the invention from the prior art. Stated in a different way which uses the Bosch Pat. No. 4,353,272 as an example, the Bosch shift map identifies approximately the best transmission gear ratio, but it does not provide an actual magnitude or magnitudes correlated to the amount by which engine performance could be improved using the best ratio under the existing conditions of power output and vehicle speed.

Yet another variation of the present invention helps illustrate this second aspect of novelty. This variation would dispense with all of the steps in FIG. 3 after the juncture of steps 50 and 53, rather than all of the steps before this juncture. A visual display which includes the magnitude determined by the righthand outcome of step 50 would make any further steps unnecessary by relying on the vehicle operator to use the displayed information in judging the appropriateness of a gearshift to the best gear ratio. The displayed information could take any of several different forms, including for example the identity of the best gear ratio together with current and available fuel economy in miles per gallon as derived from steps 42 and 49 respectively (step 50 also being omitted).

As one might guess, the manual execution of gearshifts necessitated by a visual display for the vehicle operator would be most appropriate with manual rather than automatic transmissions. (In accordance with the terminology in the appended claims, the step 45 in FIG. 3 is said to select new gear ratios, but it does not enable the new ratios. The shift actuator 13 performs that separate function, which can also be left to the vehicle operator.) To go even further in the direction of simplicity, a conventional throttle linkage could replace the drive-by-wire arrangement whose operation is represented in FIG. 6. A conventional throttle linkage would require the commanded power output 39 to be replaced by the actual power output as retrieved from stored engine data using measured values of current throttle position and crankshaft speed. However, without the transient deviation of commanded power output from the actual power output, the not found outcome of step 42 would not be available for selecting downshifts to increase power output beyond that available in the current gear ratio. Here again, reliance would be made on the judgment of the vehicle operator, but this is reasonable in the case of a manual transmission. A third aspect of the novelty of the present invention can be introduced by reconsidering the use of step 49 to generate a transmission shift map. If step 35 excludes operation with the lock-up clutch 16 engaged only during cold operation of the engine 10, then step 49 would be required to generate an extra shift map just for use when the engine 10 is cold. In contrast, the preferred embodiment continuously updates not one, but two magnitudes in parallel steps 42 and 49, and this allows the step 35 to preselect any number of different combinations of operating modes without any ROM space being needed for extra data maps. There is no requirement that the two magnitudes be of modified or even actual fuel flow rates. Using BSFC values is just one alternative, but BSFC can still be said to be indicative of fuel flow rate because the product of BSFC and engine power output is fuel flow rate, and most especially because each of parallel steps 42 and 49 applies to the very same value of commanded power output 39. (The preferred embodiment uses fuel flow rate values rather than fuel consumption values simply because BSFC values approach infinity under low torque operation of the engine 10; such large values are not as conveniently stored in the engine data maps 51 and 52.) Even values of current fuel economy and available fuel economy in miles per gallon are indicative of the corresponding fuel flow rates because the very same current value of vehicle speed in miles per hour must be divided by each of the two values in miles per gallon to thereby yield the two fuel flow rates in gallons per hour.

Another advantage unique to continuously updating two magnitudes as in parallel steps 42 and 49 again relates to operation of the engine 10 immediately following a cold start. At such times, it is likely that a migration to generally lower BMEP operation of the engine 10 would be desirable, if not required. It is also likely that enrichment of the engine fuel-air mixture will be needed for cold operation, and such enrichment will clearly move operation of the lean-burn engine 10 in the opposite BMEP direction. The simple expedient of adding (in steps 42 and 49) a hypothetical fuel flow rate at large openings of the throttle 18 will obviously have the desired effect of moving engine operation away from those large throttle openings. The weighting factor for this punitive component of modified fuel flow rate can increase smoothly with increasing opening of the throttle 18, and it can decay to zero gradually as the engine 10 warms up.

As just suggested, the engine throttle data maps 71 and 72 in FIG. 6 become inaccurate when the engine 10 is not in its normal lean-burn mode of operation, but this migration to inaccurately high BMEP levels during cold engine operation can be offset fairly well using the above punitive fuel flow rate. As a consequence, the temporary inaccuracy of engine throttle data maps 71 and 72 during cold engine operation becomes much more tolerable. (Any desired modification of these maps 71 and 72 can be used for cold engine operation if the effect of a punitive fuel flow is not sufficient by itself.)

A fourth aspect of novelty of the present invention results from limiting the accumulating engine performance deficit with a threshold value (from the process 55) which itself varies appropriately with relevant parameters other than the sacrifice in modified fuel flow rate. This fourth aspect of novelty adds a degree of refinement that can help make simplifications in other areas of the apparatus more acceptable. As an introduction to one such simplified variation of the invention, the special lean-burn calibration of the engine 10 causes the lowest candidate crankshaft speed that will satisfy a particular power requirement to be the most economical one from the standpoint of engine efficiency. This lean-burn calibration also makes it likely that exhaust emissions will remain reasonably low if actual fuel flow rate and modified fuel flow rate are made identical by using the simplification of zero weighting factors. In addition, the candidate engine speed most economical from the standpoint of engine efficiency will also be most economical from the viewpoint of the engine and transmission together if the transmission never has any fluid coupling or torque converter losses; this simplifying factor is also assumed to be true.

To provide more detail of this simplified variation of the invention, the wide-open-throttle (WOT) power curve for lean operation of the engine 10 will yield a WOT engine speed for producing the current value of commanded power output. The lowest candidate engine speed that equals or exceeds this WOT value will identify its corresponding gear ratio as being the best of the available ratios. In this way, the best ratio can be identified by using only a WOT power curve in place of a complete topographical mapping of engine fuel flow or related data. Furthermore, sacrifices in engine fuel flow rate can be approximated from parameters such as engine speed and throttle position to thereby totally eliminate the need for storing engine fuel flow or similar data maps in the ECM 14. The process 55 for generating a variable threshold limit for the engine performance deficit adds refinement to help offset what is lost when such approximations of the fuel flow sacrifice are used.

Two more variations of the present invention illustrate various ones of the foregoing aspects of novelty. The first of these variations employs the same ratio gap between each pair of consecutive transmission gear ratios. As a result of this constant ratio gap, the adjusted sacrifice in modified fuel flow rate as determined by the righthand outcome of step 50 can be mapped, independently of the identity of the gear ratio currently being used, onto the area of commanded power output versus measured crankshaft speed. Several of these maps can always be used to eliminate step 50 and its preceding steps in FIG. 3, but the result is not so viable unless constant gear ratio gaps and consistently high efficiency of power transmission make a single map applicable to each of the available gear ratios.

The remaining variation goes in the other extreme to accommodate the additional variable introduced when different split-power paths in the transmission pass different percentages of engine power through the transmission torque converter. For instance, the 1st and 2nd gear ratios in the transmission would pass 100% of engine power through the torque converter, while the 3rd gear ratio would pass 60% through the converter and the overdrive ratio would by-pass all power around the converter. In this situation, the entire combination of the engine and transmission can be dynamometer tested to yield separate throttle position and fuel flow maps for each of the gear ratios; the maps for 1st and 2nd gear will differ only by a constant RPM scaling factor equal to the ratio gap between 1st and 2nd. (Here again, all of these data maps can be synthesized fairly accurately from dynamometer data obtained from testing the engine alone and the torque converter alone.) Since the transmission output shaft serves as the output shaft for the power unit comprising the engine and the entire transmission together, all of the engine fuel flow data maps are consulted at the same candidate operating speed, which is the current operating speed of the transmission output shaft. This broader approach to data mapping will inherently allow for all types of transmission losses, but the required extra data storage space is essentially wasted when all of the various operating modes can be grouped into one or two categories within which the transmission losses are nearly the same. One such category obviously includes operation in any f the gear ratios of the gearbox 11 accompanied by the engaged state of the lock-up clutch 16.

Returning now to an overall view of the operation of the present invention, it is interesting to investigate some effects of engine calibration. As an introduction, the engine 10 will frequently utilize an effectively wide open position of its throttle 18 in developing even the moderate levels of power output commanded by only moderate travel of the accelerator pedal 23. Consistent with this unusual combination of a wide open throttle and only moderate travel of the accelerator pedal is the fact that the lean-burn calibration of the engine 10 sacrifices torque output at wide open throttle in order to make improvements in both efficiency and exhaust emission control. Nevertheless, full torque output is still available when the pedal 23 reaches its position of full travel.

In contrast to the lean-burn engine 10, a conventionally-calibrated automotive engine always uses fuel-air ratio enrichment at wide open throttle. This WOT enrichment does increase engine torque output, but at high cost to both efficiency and exhaust emission levels. Consequently, the present invention would actually avoid WOT engine operation at low and moderate power levels if the engine 10 were replaced by a conventionally-calibrated engine. Since the corresponding embodiment in the Bosch Pat. No. 4,353,272 includes no provision for exhaust emissions weighting factors, frequent use of WOT engine operation would still characterize moderate levels of power output even though the Bosch disclosure also specifies conventional Otto engine calibration. So the special lean-burn calibration of the engine 10 allows the present invention to avoid serious exhaust emission problems, while at the same time providing superior fuel economy in comparison to the Bosch approach. In addition, the present invention solves the problem of shift busyness that becomes apparent when engine operating speeds are reduced in search of improved fuel economy.

In the following claims, the term "Otto cycle engine" has an established definition that is functional. Which is to say that any new device, no matter how different structurally from all previous types of Otto engines, will be classified as being a Otto engine if it meets the established requirements of function. This is clear from the wide structural diversity of Otto engines that exist already, as is illustrated by comparing reciprocating piston engines to the Wankel rotary engine. (The functional category of continuously variable transmissions contains even more structural diversity as can be seen by comparing hydrostatic transmissions to variable traction or belt drives to motor-generator arrangements.) More importantly, the scope of any patent claim which includes an Otto engine as an element in a novel combination with other elements would encompass all new Otto engines invented subsequent to the claim.

Unfortunately, there are no established functional definitions suitable for other major elements in the following claims. Accordingly, the following claims often make their own definitions by specifying what functions the named element is operative to perform. For example, when engine fuel flow data is entered at all of the candidate engine operating speeds available for producing a given single level of power output, it is a simple matter to compare the resulting fuel flow rates to thereby identify the most economical one of the available gear ratios. Nevertheless, the identity of the most economical ratio could alternatively come from a transmission shift map, with the engine fuel flow data then being entered at never more than two points—one for the most economical ratio and one for the current gear ratio. This example emphasizes that identifying the most economical gear ratio, and then determining a sacrifice in fuel flow rate based on that ratio, are indeed two separate functions for each of which several alternatives have been disclosed. In the following claims, novelty resides in the combination of elements, and sometimes within individual elements as well.

What is claimed is:

1. Apparatus for improving the efficiency with which mechanical power is produced by a combustion engine and delivered through a discrete-ratio gearbox to a load, the apparatus comprising:

means containing at least one stored array of data which yield a continuous range of a performance parameter when said array is addressed using variables indicative of a power level and an operating speed, said performance parameter being based at least primarily on fuel consumption of the engine, iterating means operative to select for the gearbox tentative gearshifts each of which offers a magnitude of increase in performance of the engine as based on values of said performance parameter obtained from said stored array of data, and means operative to incorporate a variable time delay before executing said tentative gearshifts, said delay having a longer duration when said magnitude of increase in engine performance is less significant, and said tentative gearshifts being aborted when they cease to offer said increase in engine performance before expiration of said time delay, whereby fuel economy is well balanced against the number of gearshifts performed.

2. The apparatus of claim 1 wherein the engine is an Otto cycle engine having a throttle valve device used in regulating torque output of the engine, (b) further comprising drive-by-wire means operative to control said torque output of the engine in response to status of an operator input device and also operative to control said torque output of the engine independently of said operator input status to thereby automatically close gaps in engine power output caused by executing said tentative gearshifts, and (c) further comprising an intake mixture preparation system for the engine having a predetermined calibration which automatically secures a predetermined reduction in brake specific fuel consumption of the engine when density of combustion air for the engine is substantially maximized, including said throttle valve device being in positions which substantially minimize throttling of said engine combustion air, said reduction in engine BSFC being obtained by using a predetermined amount of air-fuel charge dilution to improve the balance between mechanical and thermal losses occurring in the engine, and said predetermined calibration making said predetermined reduction in engine BSFC available throughout a wide range of power produced by the engine, whereby (a) said drive-by-wire means reduces the need for shift schedule hysteresis, (b) the engine obtains higher efficiency due to said predetermined engine calibration and (c) said tentative gearshifts use lower operating speeds of the engine as a result of said predetermined calibration, and (d) said variable time delay prevents the low power reserve of said lower operating speeds from causing excessive gearshifting.

3. The apparatus of claim 1 (a) wherein the engine is naturally-aspirated Otto cycle engine having a throttle valve device used to provide substantially all control of combustion air density for the engine, (b) further comprising drive-by-wire means operative to control torque output of the engine in response to status of an operator input device and also operative to control said torque output independently of said operator input status to thereby automatically close gaps in engine power output caused by executing said tentative gearshifts, and (c) further comprising an intake mixture preparation system for the engine having a predetermined calibration which automatically secures a predetermined reduction in brake specific fuel consumption of the engine when said throttle valve device is at least effectively wide open, said reduction in engine BSFC being gained at the expense of a predetermined loss in magnitude of said engine output torque, said predetermined calibration using air-fuel charge dilution to secure said wide open throttle (WOT) tradeoff of engine brake torque for reduced BSFC, and said predetermined calibration making said WOT tradeoff available throughout a wide range of the power produced by the engine.

4. Apparatus for selecting an active gear ratio in a gearbox which has a choice of various discrete gear ratios available to function as said active gear ratio by transferring mechanical power from a power output shaft of a combustion engine to a power output shaft of the gearbox, the engine having a current value of modified fuel flow rate that applies to operation when (a) the power as delivered to a load by said gearbox output shaft has a value which is current, (b) said gearbox output shaft is operating at its current rotational speed and (c) the gearbox is transferring power from the engine to the load using one of said choice of gear ratios which is currently said active gear ratio, said modified fuel flow rate being a product of brake specific cost of engine operation and power concurrently developed by the engine for delivery to the load, and said brake specific cost of engine operation comprising mass amount of fuel consumed by the engine in producing one brake-horsepower-hour of mechanical energy for delivery to the load, the apparatus comprising:

first means operative to identify a tentatively better one of said choice of gear ratios which is different from said currently active gear ratio, the engine having an improved value of said modified fuel flow rate that applies to operation when (a) the power as delivered to the load by said gearbox output shaft has said current value, (b) said gearbox output shaft has said current value of rotational speed and (c) the gearbox is transferring power from the engine to the load using said tentatively better gear ratio, said improved value of modified fuel flow rate being numerically less than said current value of modified fuel flow rate by a sacrifice in fuel flow rate, second means operative to reduce said sacrifice in fuel flow rate by implementing at separate iterations each of (a) refraining from selecting said tentatively better gear ratio to replace said currently active gear ratio for transferring power from the engine to the load to thereby initiate a period of waiting for said sacrifice in fuel flow rate to inherently decrease due to changes in factors comprising magnitude of the power as delivered to the load and rotational speed of said gearbox output shaft, a decrease to zero in said sacrifice in fuel flow rate before expiration of said waiting period causing an accumulation of values over said waiting period to be reset to an initial value, (b) refraining from selecting said tentatively better gear ratio to replace said currently active gear ratio to thereby continue said waiting period, said waiting period being limited in duration by a threshold for said accumulation of values, said accumulation approaching said threshold at a rate generally greater when said sacrifice in fuel flow is relatively large, and (c) selecting said tentatively better gear ratio to replace said currently active gear ratio when said accumulation of values reaches said threshold, and third means operative to repeatedly activate said first and said second means to thereby generate said iterations and to thereby cause said accumulation of values over said waiting period, whereby said sacrifice in fuel flow rate is reduced, but not without regard for the average frequency of gearshifts.

5. The apparatus of claim 4 wherein said accumulation of values is an accumulation of at least approximate values of said sacrifice in fuel flow rate current during said waiting period, whereby an elective gearshift is measured against an at least approximate amount of fuel sacrificed by not executing said elective gearshift.

6. The apparatus of claim 4 wherein said accumulation of values approximates a mathematical integration of said sacrifice in fuel flow rate over said waiting period, whereby said threshold for said accumulation accurately represents an actual quantity of fuel when said brake specific cost of engine operation consists of said mass amount of fuel consumed by the engine in producing one BHP-HR of mechanical energy.

7. The apparatus of claim 4 wherein the load is that of a motor vehicle powered by the engine and wherein said threshold for limiting said waiting period varies with factors comprising acceleration of said motor vehicle, said threshold decreasing as said acceleration increases, whereby the inherent need for upshifts during acceleration is utilized to at least reduce delay of said upshifts, but without seriously compromising reduction in the average number of gearshifts.

8. The apparatus of claim 4 wherein said first means includes at least one stored array of data which accurately yield a continuous range of a performance parameter when said array is addressed using variables indicative of a power level and an operating speed, said performance parameter being based at least primarily on fuel consumption of the engine, whereby said stored array of data serves as the basis for obtaining values used in said accumulation of values.

9. Apparatus for improving the efficiency with which mechanical power is produced by a combustion engine and delivered through a discrete-ratio gearbox to a load, the engine having torque control means (a) comprising at least one engine control device and (b) used to provide substantially all regulation of brake torque produced at a power output shaft of the engine for delivery to the gearbox, the engine having means operative to automatically regulate mass consumption rate of fuel by the engine according to a calibration which depends on both of operating speed of said engine power output shaft and status of said engine torque control means, and the engine having in conjunction with said fuel consumption calibration a topographical data surface of brake specific cost of engine operation on an area defined by operating speed of said engine power output shaft and by a wide range of the power produced by the engine, said brake specific cost of engine operation comprising mass amount of said fuel consumed by the engine in producing one brake-horsepower-hour of mechanical energy for delivery to the to the load and minimization of said brake specific cost of engine operation on said topographical surface of brake specific cost yielding an uninterrupted schedule of operating speed of said engine power output shaft over said wide range of the power produced by the engine, the apparatus comprising:

first means for storing performance data, all of said uninterrupted schedule of minimum brake specific cost being reproducible with good accuracy from a constant multiplying factor and data consisting of said performance data stored by said first means, and second means operative to repeatedly perform a comparison of different ones of a choice of gear ratios made available by the gearbox for transferring the power from the engine to the load, each iteration of said comparison of gear ratios utilizing a candidate data value retrieved from said stored performance data for each of said different ones of said available gear ratios, each one of said candidate values being associated with a particular one of said choice of gear ratios and being current for steady-state power produced by the engine and accurate for operating speed of the engine which produces current operating speed of the load using said particular gear ratio said steady-state power level, and said comparison of gear ratios including selection of one of said different gear ratios which is best from the standpoint of minimizing said brake specific cost of engine operation, whereby gear ratios are selected to thereby improve fuel economy.

10. The apparatus of claim 9 wherein said topographical surface of brake specific cost of engine operation is, over said wide range of the power produced by the engine, accurately reproducible from a constant multiplying factor and data consisting of said performance data stored by said first means, whereby said selection of a gear ratio best from the standpoint of brake specific cost can be accurately made without regard for the nature of said uninterrupted schedule of minimum brake specific cost of engine operation.

11. The apparatus of claim 10 wherein said performance data stored by said first means comprises a topographical data surface of modified fuel flow rate, said modified fuel flow rate being a product of said brake specific cost of engine operation and power concurrently developed by the engine,
whereby an improvement in engine performance made available by a gearshift is directly quantified as a reduction in said modified fuel flow rate.

12. The apparatus of claim 9 further comprising:
means operative to command a varying desired level for the power produced by the engine, said commanded power level having a discrete current value and each of said candidate data values retrieved from storage for making said comparison of gear ratios being current for said commanded power level,
means operative to enable said best gear ratio selected by said second means as a result of said comparison of gear ratios,
and drive-by-wire means operative to adjust said status of said engine torque control means to thereby substantially equalize current magnitude of the power produced by the engine to said current value of commanded power,
whereby gearshifts for improved fuel economy are performed automatically and whereby said drive-by-wire means automatically closes power gaps caused by said automatic gearshifts.

13. The apparatus of claim 12 wherein said drive-by-wire means comprises means for storing engine power output data which relate said status of said engine torque control means to a constant multiple of operating speed of said engine power output shaft and to magnitude of the power produced by the engine,
whereby said power equalization is achieved without need for direct measurement of the power produced by the engine.

14. The apparatus of claim 12 further comprising means operative to implement at separate iterations of said comparison of gear ratios each of (a) refraining from enabling a gearshift to said best gear ratio selected in said comparison of gear ratios to thereby initiate a period of waiting for a change in factors comprising said commanded power level and operating speed of the load to make said gearshift to said best ratio unnecessary from the standpoint of said brake specific cost of engine operation, occurrence of said awaited change in factors before expiration of said waiting period causing an accumulation of values determined in successive iterations of said comparison of gear ratios to be reset to an initial value, (b) refraining from enabling said gearshift to said best gear ratio to thereby continue said waiting period, said waiting period being limited in duration by a threshold for said accumulation of values, said accumulation at least roughly approximating a mathematical integration over said waiting period of a product of an improvement made available in said brake specific cost of engine operation by said gearshift to said best gear ratio and power concurrently developed by the engine, and (c) enabling said gearshift to said best gear ratio when said accumulation of values reaches said threshold,
whereby said brake specific cost of engine operation is automatically reduced, but not without regard for a generally reduced frequency of performing gearshifts.

15. The apparatus of claim 14 wherein the load is that of a motor vehicle powered by the engine and wherein said threshold for limiting said waiting period varies with factors comprising acceleration of said motor vehicle, said threshold decreasing as said acceleration increase,
whereby the inherent need for upshifts during acceleration is utilized to at least reduce delay of said upshifts during acceleration, but without significantly comprising said generally reduced frequency of performing gearshifts.

16. Apparatus for enhancing selection of an active gear ratio in a gearbox which has a choice of various discrete gear ratios available to function as said active gear ratio by transferring mechanical power from a power output shaft of a combustion engine to a power output shaft of the gearbox, the apparatus comprising:
first means containing at least one stored array of data which yield a performance parameter when addressed at particular values indicative of an operative speed and a power level, said performance parameter being selected from a parameter indicative of brake specific cost of engine operation and a parameter indicative of a difference in said brake specific cost of engine operation, said brake specific cost of engine operation comprising mass amount of fuel consumed by the engine in producing one brake-horsepower-hour of mechanical energy for delivery to a load driven by said gearbox output shaft,
second means operative to use a measurement to obtain at least one of said particular value indicative of operating speed as used to address said at least one stored array of data,
third means operative to provide said particular value indicative of a power level as used to address said at least one stored array of data, said power level being substantially equal during steady-state operation of the engine to power being delivered to said load from said gearbox power output shaft,
and fourth means operative to repeatedly determine an indicator for an actual magnitude of improvement currently being made available in said brake specific cost of engine operation by a gearshift from one of said choice of gear ratios that is currently said active gear ratio to a different one of said choice of ratios, said indicator of improvement being determined by said fourth means using procedures comprising using said particular values indicative of speed and power from said second and said third means respectively to address said at least one array of data stored by said first means to thereby obtain at least one current value of said performance parameter,
whereby said indicator of improvement facilitates an enhanced compromise between minimizing said brake specific cost of engine operation and reducing the average frequency of gearshifts.

17. The apparatus of claim 16 further comprising fifth means operative to reduce said brake specific cost of engine operation by implementing, at separate determinations by said fourth means of said indicator of improvement, each of (a) refraining from selecting said different gear ratio to replace said currently active gear ratio for transferring power from the engine to said load to thereby initiate a period of waiting for said actual magnitude of improvement in brake specific cost to inherently decrease due to a change in factors comprising current magnitude of power produced by the engine and current rotational speed of said gearbox power output shaft, decrease to zero in said actual magnitude of improvement in brake specific cost before expiration of said waiting period causing the resetting to zero of an accumulation of values obtained in successive determinations by said fourth means of said indicator of improvement, (b) refraining from selecting said different gear ratio to replace said currently active gear ratio to thereby continue said waiting period, said waiting period being limited in duration by a threshold for said accumulation of values, said accumulation at least roughly approximating a mathematical integration over said waiting period of a product of said actual magnitude of improvement in brake specific cost and power concurrently developed by the engine, and (c) selecting said different gear ratio to replace said currently active gear ratio when said accumulation of values reaches said threshold, whereby said enhanced compromise between brake specific cost and gearshift frequency is achieved automatically.

18. The apparatus of claim 17 wherein said load is that of a motor vehicle powered by the engine and wherein said threshold for limiting said waiting period varies with factors comprising acceleration of said motor vehicle, said threshold decreasing as said acceleration increases, whereby the inherent need for upshifts during acceleration is utilized to at least reduce delay of said upshifts during acceleration, but without seriously compromising said reduced frequency of gearshifts.

19. The apparatus of claim 16 wherein said performance parameter of said at least one stored array of data is indicative of said brake specific cost of engine operation, whereby a single one of said at least one stored array of data can serve more than one of said choice of gear ratios.

20. The apparatus of claim 17 wherein said performance parameter of said at least one stored array of data is indicative of said brake specific cost of engine operation, whereby a single one of said at least one stored array of data can serve more than one of said choice of gear ratios.

21. The apparatus of claim 17 wherein said fifth means includes means operative to enable said different gear ratio when it is selected by said fifth means to replace said currently active gear ratio, and wherein said power level used in addressing said at least one stored array of data is a desired level for the power produced by the engine, whereby gearshifts are performed automatically and whereby transient elevation of said desired power level above power actually produced by the engine ensures rapid automatic downshifting when necessary.

22. The apparatus of claim 21 further comprising drive-by-wire means operative to regulate torque output of the engine to thereby substantially equalize current magnitude of the power produced by the engine to current magnitude of said desired power level, whereby said drive-by-wire means automatically closes power gaps caused by said automatic gearshifts.

23. The apparatus of claim 22 wherein said drive-by-wire means comprises means for storing engine power output data which relate status of an engine torque control device to magnitude of the power produced by the engine and to operating speed of said engine power output shaft, whereby direct measurement of engine power output is unnecessary.

24. Apparatus for improving the efficiency with which a combustion engine powers a motor vehicle through a transmission which has a choice of different forward speed ratios available for coupling a power output shaft of the engine to a power output shaft of the transmission, the engine having (1) torque control means which (a) comprises at least one engine control device and (b) is used to provide substantially all regulation of brake torque produced at said engine power output shaft and (2) means operative to automatically regulate mass consumption rate of fuel by the engine to a schedule which depends on both of operating speed of said engine output shaft and status of said engine torque control means, the apparatus comprising:

first means for storing data, second means operative to use said first means to identify upshifts for the transmission substantially according to a transmission shift map of said choice of forward speed ratios, said transmission shift map being on an area defined by (1) magnitude of power substantially as delivered by said transmission output shaft for propelling the vehicle and (2) operating of said transmission output shaft, each one of said choice of forward speed ratios having in conjunction with performance of the engine as established by said engine fuel consumption schedule a topographical map of brake specific cost of engine operation on said area of said transmission shift map, said brake specific cost of engine operation comprising mass amount of fuel consumed by the engine in delivering one brake-horsepower-hour of mechanical energy to said transmission output shaft and each individual point on said transmission shift map (a) having associated therewith particular values of said operating speed of said transmission output shaft and of said magnitude of power as delivered by said transmission output shaft and (b) being associated by said transmission shift map with one of said choice of forward speed ratios which has a candidate value of said brake specific cost of engine operation at least as low as that of any other of said choice of forward speed ratios which are capable of allowing the engine to establish said particular values of transmission output shaft speed and power, each example of said choice of speed ratios which are capable of establishing said particular values of speed and power having its candidate value of said brake specific cost of engine operation obtained from (1) a specific one of said topographical maps of brake specific cost which applies to said example speed ratio and (2) a location on said specific topographical map determined particular values of transmission output shaft speed and power, and third means operative to use said second means in selecting upshift for said transmission, at least some upshifts of the transmission being selected by said third means with a discrepancy relative to their identification in accordance with said transmission shift map, said discrepancy having at least a strong correlation to acceleration of the motor vehicle and said discrepancy being selected from (1) a significant time delay imposed between identification according to said transmission shift map and selection by said third means, duration of said time delay being reduced as acceleration of the motor vehicle increases, and (2) preemptive selection by said third means prior in time to identification according to said transmission shift map, said preemptive selection being at least strongly correlated to acceleration of the motor vehicle which is great enough in magnitude to ensure continued acceleration of the motor vehicle after execution of an upshift associated with said preemptive selection, whereby selection of upshifts identified according to said transmission shift map contributes to reduced fuel consumption of the engine.

25. The apparatus of claim 24 wherein said discrepancy between identification and selection of upshifts comprises a significant time delay imposed between identification and selection of upshifts, whereby the frequency of gearshifts is reduced to improve overall powertrain performance.

26. The apparatus of claim 24 further comprising (a) fourth means operative to enable upshifts of the transmission immediately after selection by said third means and (b) fifth means operative to determine acceleration of the motor vehicle, said third means employing acceleration o the motor vehicle as determined by said fifth means to correlate said discrepancy between identification and selection of upshifts to acceleration of the motor vehicle, whereby said correlation is more precise.

* * * * *